US010256525B2

(12) United States Patent
Chen et al.

(10) Patent No.: US 10,256,525 B2
(45) Date of Patent: Apr. 9, 2019

(54) ANTENNA STRUCTURE AND WIRELESS COMMUNICATION DEVICE USING SAME

(71) Applicant: Chiun Mai Communication Systems, Inc., New Taipei (TW)

(72) Inventors: Yi-Ting Chen, New Taipei (TW); Yen-Jung Tseng, New Taipei (TW); Tze-Hsuan Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/655,899

(22) Filed: Jul. 21, 2017

(65) Prior Publication Data
US 2018/0026336 A1  Jan. 25, 2018

Related U.S. Application Data

(60) Provisional application No. 62/365,341, filed on Jul. 21, 2016.

(30) Foreign Application Priority Data

Jul. 11, 2017 (CN) .......................... 2017 1 0562263

(51) Int. Cl.
H01Q 1/24 (2006.01)
H01Q 13/18 (2006.01)
H01Q 5/50 (2015.01)
H04Q 1/48 (2006.01)
H01Q 21/28 (2006.01)

(52) U.S. Cl.
CPC ............ *H01Q 1/242* (2013.01); *H01Q 1/243* (2013.01); *H01Q 5/50* (2015.01); *H01Q 13/18* (2013.01); *H01Q 21/28* (2013.01); *H04Q 1/48* (2013.01)

(58) Field of Classification Search
CPC .......... H01Q 13/18; H01Q 1/24; H01Q 1/242; H01Q 1/48; H01Q 5/50; H01Q 1/243; H01Q 21/28; H01Q 5/314; H01Q 5/371
See application file for complete search history.

(56) References Cited

U.S. PATENT DOCUMENTS

| 4,023,179 | A | * | 5/1977 | Ikrath | ...................... | H01Q 1/44 343/713 |
| 6,097,345 | A | * | 8/2000 | Walton | ................. | H01Q 1/1271 343/700 MS |
| 9,331,397 | B2 | * | 5/2016 | Jin | .......................... | H01Q 21/28 |
| 9,379,427 | B2 | * | 6/2016 | Xu | .......................... | H01Q 1/243 |

(Continued)

*Primary Examiner* — Tho G Phan
(74) *Attorney, Agent, or Firm* — ScienBiziP, P.C.

(57) ABSTRACT

An antenna structure includes a metallic member and an extending section. The metallic member includes a front frame, a backboard, and a side frame. The side frame defines a slot. The front frame defines a first gap and a second gap communicating with the slot and extending across the front frame. A portion of the front frame between the first gap and the second gap forms a radiating section. Current enters the first radiating section from the first feed portion and flows through the first radiating section and towards the first gap and the second gap to generate radiation signals in a first frequency band and a second frequency band; the current flows through the extending section to generate radiation signals in a third frequency band. A wireless communication device using the antenna structure is provided.

20 Claims, 26 Drawing Sheets

(56) References Cited

U.S. PATENT DOCUMENTS

| | | | | |
|---|---|---|---|---|
| 9,647,320 B2* | 5/2017 | Lin | ........................ | H01Q 1/243 |
| 9,647,332 B2* | 5/2017 | Han | ........................ | H01Q 1/50 |
| 10,008,763 B2* | 6/2018 | Huang | .................... | H01Q 1/243 |

* cited by examiner

ANTENNA STRUCTURE AND WIRELESS COMMUNICATION DEVICE USING SAME

CROSS-REFERENCE TO RELATED APPLICATIONS

This application claims priority to U.S. Patent Application No. 62/365,341 filed on Jul. 21, 2016, and claims priority to Chinese Patent Application No. 201710562263.5 filed on Jul. 11, 2017, the contents of which are incorporated by reference herein.

FIELD

The subject matter herein generally relates to an antenna structure and a wireless communication device using the antenna structure.

BACKGROUND

Metal housings, for example, metallic backboards, are widely used for wireless communication devices, such as mobile phones or personal digital assistants (PDAs). Antennas are also important components in wireless communication devices for receiving and transmitting wireless signals at different frequencies, such as wireless signals in Long Term Evolution Advanced (LTE-A) frequency bands. However, when the antenna is located in the metal housing, the antenna signals are often shielded by the metal housing. This can degrade the operation of the wireless communication device. Additionally, the metallic backboard generally defines slots or/and gaps thereon, which will affect an integrity and an aesthetic of the metallic backboard.

BRIEF DESCRIPTION OF THE DRAWINGS

Implementations of the present disclosure will now be described, by way of example only, with reference to the attached figures.

DETAILED DESCRIPTION

Figure 1:
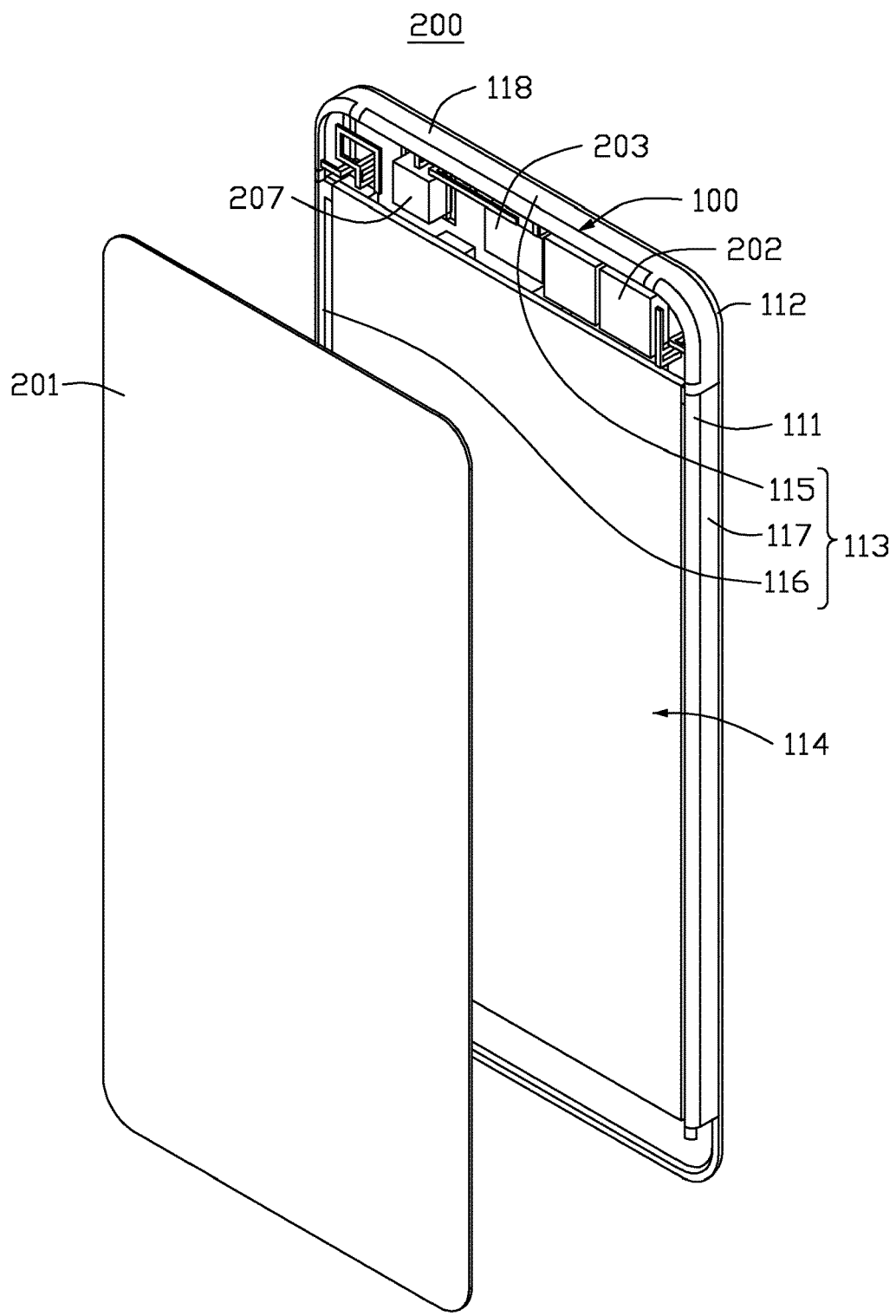
FIG. 1 is an isometric view of a first exemplary embodiment of a wireless communication device using a first exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an antenna structure and a wireless communication device using same.

FIG. 1 illustrates a first embodiment of a wireless communication device 200 using a first exemplary antenna structure 100. The wireless communication device 200 can be a mobile phone or a personal digital assistant, for example. The antenna structure 100 can receive or send wireless signals.

Figure 2:
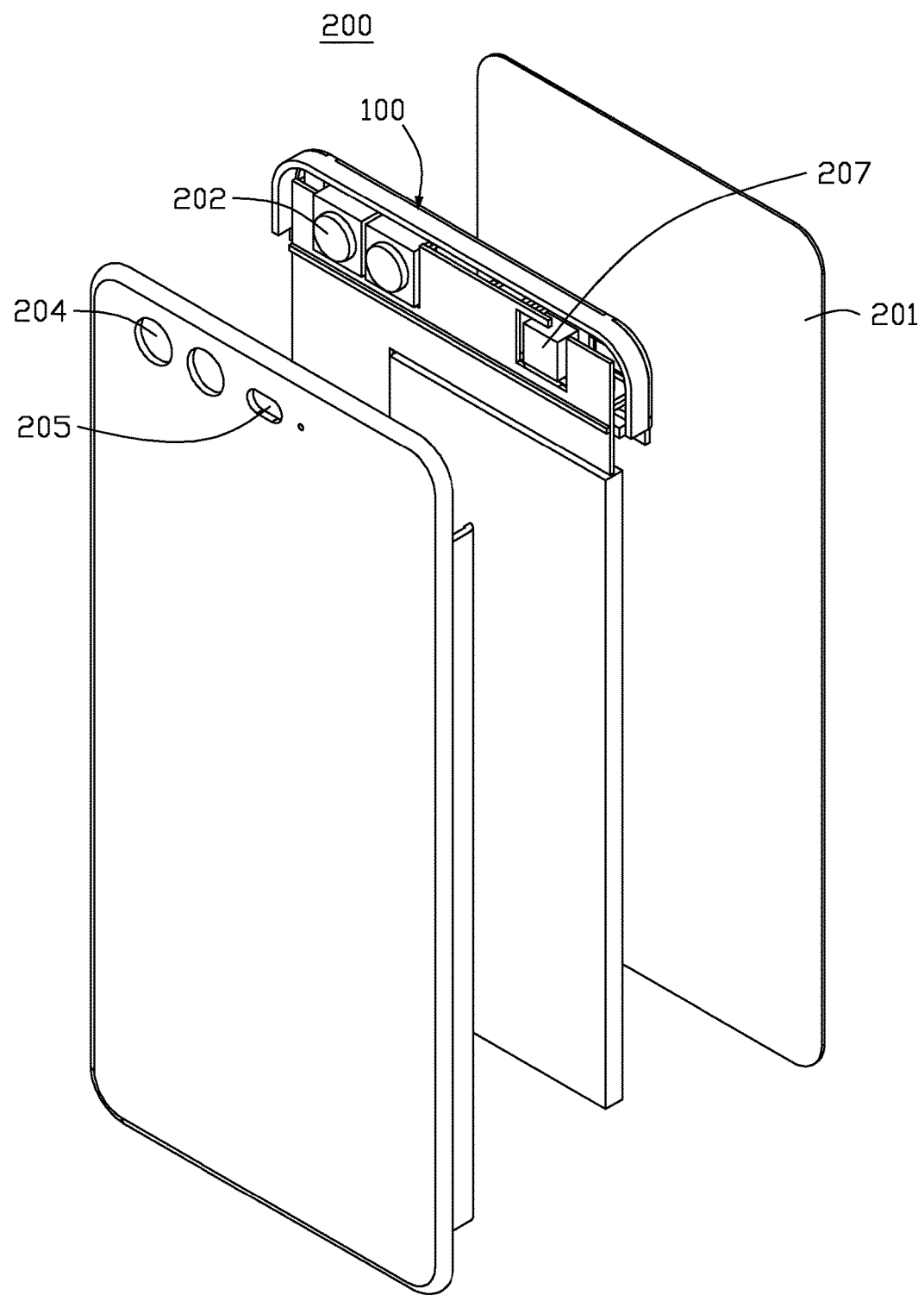
FIG. 2 is another isometric view of the wireless communication device of FIG. 1.
Figure 3:
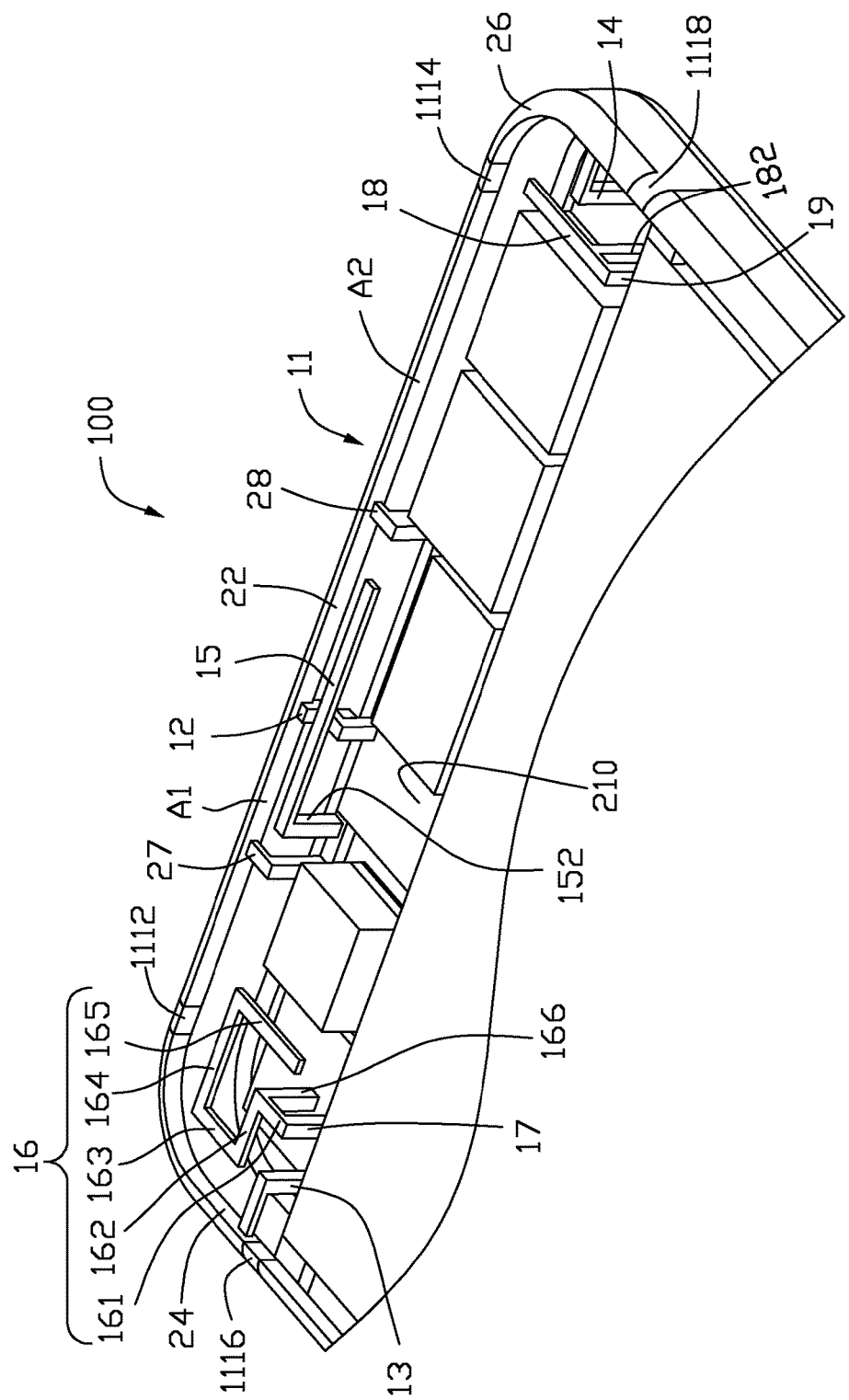
FIG. 3 is a detail view of the antenna structure of FIG. 1.
Figure 4:
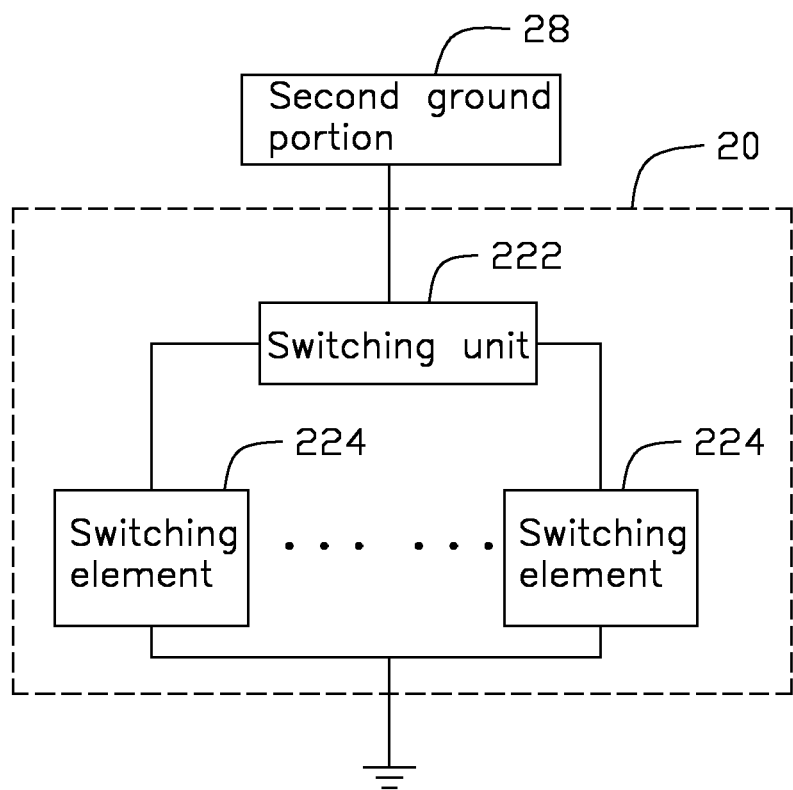
FIG. 4 is a circuit diagram of a switching circuit of the antenna structure of FIG. 1.

Per FIGS. 1-3, the antenna structure 100 includes a metallic member 11, a first feed portion 12, a second feed portion 13, a third feed portion 14, a radiating portion 15, a second radiating portion 16, a fourth feed portion 17, a third radiating portion 18, a fifth feed portion 19, and a switching circuit 20 (shown in FIG. 4).

The metallic member 11 can be a metal housing of the wireless communication device 200. In this exemplary embodiment, the metallic member 11 is a frame structure and includes a front frame 111, a backboard 112, and a side frame 113 as shown in FIG. 1. The front frame 111, the backboard 112, and the side frame 113 can be integral with each other. The front frame 111, the backboard 112, and the side frame 113 cooperatively form the metal housing of the wireless communication device 200. The front frame 111 defines an opening (not shown) thereon. The wireless communication device 200 includes a display 201. The display 201 is received in the opening. The display 201 has a display surface. The display surface is exposed at the opening and is positioned parallel to the backboard 112.

The backboard 112 is positioned opposite to the front frame 111. The backboard 112 is coupled to the side frame 113, and there is no gap between the backboard 112 and the side frame 113. The backboard 112 is an integrally formed metallic sheet. Except the holes 204, 205 for exposing dual backside cameras 202 and a receiver 203, the backboard 112 does not define any other slot, break line, and/or gap as shown in FIG. 2. The backboard 112 serves as a ground of the antenna structure 100.

The side frame 113 is positioned between the front frame 111 and the backboard 112. The side frame 113 is positioned around a periphery of the front frame 111 and a periphery of the backboard 112. The side frame 113 forms a receiving space 114 together with the display 201, the front frame 111, and the backboard 112. The receiving space 114 can receive a print circuit board 210, a processing unit (not shown), or other electronic components or modules. In this exemplary embodiment, the electronic components or modules at least include the dual backside cameras 202, the receiver 203, and a front camera 207. The dual backside cameras 202, the receiver 203, and the front camera 207 are arranged on the print circuit board 210 and spaced apart from each other.

Referring to FIG. 1, the side frame 113 includes a top portion 115, a first side portion 116, and a second side portion 117. The top portion 115 connects the front frame 111 and the backboard 112. The first side portion 116 is spaced apart from and parallel to the second side portion 117. The top portion 115 has first and second ends. The first side portion 116 is connected to the first end of the first frame 111 and the second side portion 117 is connected to the second end of the top portion 115. The first side portion 116 connects the front frame 111 and the backboard 112. The second side portion 117 also connects the front frame 111 and the backboard 112. The side frame 113 defines a slot 118. In this exemplary embodiment, the slot 118 is defined at the top portion 115 and extends to the first side portion 116 and the second side portion 117. In other exemplary embodiments, the slot 118 can only be defined at the top portion 115 and does not extend to any one of the first side portion 116 and the second side portion 117. In other exemplary embodiments, the slot 118 can be defined only at the top portion 115, but not extending to any of the first side portion 116 and the second side portion 117. In other exemplary embodiments, the slot 118 can be defined at the top portion 115 and extends to one of the first side portion 116 and the second side portion 117.

Referring to FIG. 3, the front frame 111 includes a top arm (not labeled) corresponding to the top portion 115 and two side arms (not labeled) corresponding to the first side portion 116 and the second side portion 117. The front frame 111 defines a first gap 1112 and a second gap 1114 at the top arm and a third gap 1116 and a four gap 1118 at the two side arms, respectively. The third gap 1116 and the four gap 1118 are defined on opposite ends of the slot 118. The gaps 1112, 1114, 1116, 1118 are in air communication with the slot 118 and extend across the front frame 111. The front frame 111 is divided by the gaps 1112, 1114, 1116, 1118 into three portions, which are a first radiating section 22, a second radiating section 24, and a third radiating section 26. In this exemplary embodiment, the first gap 1112 and the second gap 1114 are defined on the top arm of the front frame 111. The first gap 1112 and the second gap 1114 are respectively disposed adjacent to corners on opposite ends of the top arm, the first radiating section 22 is formed between the first gap 1112 and the second gap 1114. The second radiating section 24 is formed between the first gap 1112 and the third gap 1116, extends from the top arm to a side arm of the front frame 111, and crosses an arc corner. The third radiating section 26 is formed between the second gap 1114 and the fourth gap 1118, extends from the top arm to another arm of the front frame 111, and crosses another arc corner. In this exemplary embodiment, the slot 118 and the gaps 1112, 1114, 1116, 1118 are filled with insulating material, for example, plastic, rubber, glass, wood, ceramic, or the like, thereby isolating the first radiating section 22, the second radiating section 24, the third radiating section 26, and the backboard 112.

In this exemplary embodiment, except for the slot 118 and the gaps 1112, 1114, 1116, 1118, an upper half portion of the front frame 111 and the side frame 113 does not define any other slot, break line, and/or gap. That is, there are only the gaps 1112, 1114, 1116, 1118 defined on the upper half portion of the front frame 111.

Referring to FIG. 3, the first feed portion 12 is electrically connected to an end the first radiating section 22 adjacent to the first gap 1112 through a matching circuit (not shown), thus the first feed portion 12 feeds in current for the first radiating section 22. In this exemplary embodiment, after the current is fed into the first feed portion 12, the current flows towards the first gap 1112 and the second gap 1114 along the first radiating section 22. Thus, the first radiating section 22 is divided into a short portion A1 and a long portion A2 by a connecting point of the first feed portion 12. The short portion A1 extends towards the first gap 1112 and the long portion A2 extends towards the second gap 1114 from the connecting point of the first feed portion 12. In this exemplary embodiment, the connecting point of the first feed portion 12 is not positioned at a middle portion of the first radiating section 22. The long portion A2 is longer than the short portion A1. The short portion A1 activates a first mode to generate radiation signals in a first frequency band, the long portion A2 activates a second mode to generate radiation signals in a second frequency band. In this exemplary embodiment, the first mode is a LTE-A (Long Term Evolution Advanced) middle frequency operation mode, the first frequency band is a frequency band of about 1805-2170 MHz. The second mode is a LTE-A low frequency operation mode, the second frequency band is a frequency band of about 703-960 MHz.

The first radiating section 22 is connected to a first ground portion 27 and a second ground portion 28. The first ground portion 27 and the second ground portion 28 are arranged on two sides of the first feed portion 12. The first ground portion 27 and the second ground portion 28 are both substantially L-shaped arms.

The first radiating portion 15 is substantially L-shaped, one arm of the first radiating portion 15 is parallel to the first ground portion 27 and connects to the a third ground portion 152, the other arm of the first radiating portion 15 is parallel to the first radiating section 22. The first radiating portion 15 obtains coupling current from the first radiating section 22 to activate the first frequency band. In this exemplary embodiment, the first radiating section 22, the first feed portion 12, the first ground portion 27, the second ground portion 28, the first radiating portion 15, and the third ground portion 152 cooperatively form a first diversity antenna. The first diversity antenna resonates radiation signals of the LTE-A low frequency operation mode and the LTE-A middle frequency operation mode.

The second feed portion 13 is substantially L-shaped, one end of the second feed portion 13 connects to the second radiating section 24 and is adjacent to the third gap 1116. The second feed portion 13 feeds in current into the second radiating section 24 to cooperatively activate a third mode to generate radiation signals in a third frequency band. In this exemplary embodiment, the third mode is a GPS mode, the third frequency band is a frequency band of about 1575 MHz. The second radiating section 24 and the second feed portion 13 cooperatively form a GPS antenna resonating radiation signals covering GPS frequency band.

The third feed portion 14 is substantially L-shaped, one end of the third feed portion 14 connects to the third radiating section 26 and is adjacent to the four gap 1118. The third feed portion 14 feeds in current into the third radiating section 26 to cooperatively activate a fourth mode to generate radiation signals in a fourth frequency band. In this exemplary embodiment, the fourth mode is a WiFi 2.4G mode, the fourth frequency band is a frequency band of about 2400-2484 MHz. The third radiating section 26 and the third feed portion 14 cooperatively form a WiFi 2.4G antenna resonating radiation signals covering WiFi 2.4G frequency band.

The second radiating portion 16 is spaced apart from the first radiating section 22, the second radiating section 24, the second feed portion 13, and the front camera 207. The second radiating portion 16 is received in a space surrounded by the first radiating section 22, the second radiating section 24, the second feed portion 13, and the front camera 207. The second radiating portion 16 includes a first arm 161, a second arm 162, a third arm 163, a fourth arm 164, and a fifth arm 165, which are substantially straight arms. The second radiating portion 16 connects to the fourth feed portion 17 and a fourth ground portion 166. In this exemplary embodiment, the fourth feed portion 17 and the fourth ground portion 166 are both substantially straight arms and parallel to each other. The first arm 161 is perpendicularly connected between the fourth feed portion 17 and the fourth ground portion 166. The second arm 162 is perpendicularly connected between the first arm 161 and the third arm 163. The first arm 161 and the third arm 163 are parallel and extend from two opposite ends of the second arm 162. The second arm 162 and the fourth arm 164 are parallel and extend from two opposite ends of the third arm 163. The fourth arm 164 is perpendicularly connected between the third arm 163 and the fifth arm 165. The third arm 163 and the fifth arm 165 are parallel and extend from two opposite ends of the fourth arm 164. A length of the fifth arm 165 is greater than a length of the third arm 163, and a length of the fourth arm 164 is greater than a length of the second arm 162. The third arm 163 is parallel to and spaced apart from the second radiating section 24, the fourth arm 164 is parallel to and spaced apart from the short portion A1, and the fourth feed portion 17 is parallel to and spaced apart from the second feed portion 13. The fourth feed portion 17 feeds current into the second radiating portion 16 to cooperatively activate a fifth mode to generate radiation signals in a fifth frequency band. In this exemplary embodiment, the fifth mode is a LTE-A high frequency mode, the fifth frequency band is a frequency band of about 2300-2690 MHz. The second radiating portion 16, the fourth feed portion 17, and the fourth ground portion 166 cooperatively form a second diversity antenna resonating radiation signals covering high frequency band.

The third radiating portion 18 is spaced apart from the dual backside cameras 202, the third radiating section 26, and the second gap 1114. The third radiating portion 18 is received in a space surrounded by the dual backside cameras 202 and the third radiating section 26. The third radiating portion 18 is a substantially straight arm and is parallel to the third radiating section 26. The third radiating portion 18 connects to the fifth feed portion 19 and a fifth ground portion 182. In this exemplary embodiment, the fifth feed portion 19 and the fifth ground portion 182 are both substantially straight arms and parallel to each other. The fifth feed portion 19 feeds current into the third radiating portion 18 to cooperatively activate a sixth mode to generate radiation signals in a sixth frequency band. In this exemplary embodiment, the sixth mode is a WiFi 5G mode, the sixth frequency band is a frequency band of about 5150-5850 MHz. The third radiating portion 18, the fifth feed portion 19, and the fifth ground portion 182 cooperatively form a WiFi 5G antenna resonating radiation signals covering the WiFi 5G frequency band.

Per FIG. 4, the switching circuit 20 is arranged on the circuit board 210. One end of the switching circuit 20 is electrically connected to the second ground portion 28, the other end connects to the ground. The backboard 112 serves as the ground of the antenna structure 100. Perhaps, a middle frame or a shielding mask (not shown) also may serves as the ground of the antenna structure 100, the middle frame can be a shielding mask for shielding electromagnetic interference arranged on the display 201 facing the backboard 112. The shielding mask or the middle frame can be made of metal material. The shielding mask or the middle frame may connect to the backboard 112 to form a greater ground for the antenna structure 100. In summary, each ground portion directly or indirectly connects to the ground.

The switching circuit 20 includes a switching unit 222 and a plurality of switching elements 224. The switching unit 222 is electrically connected to the second ground portion 28. The switching elements 224 can be an inductor, a capacitor, or a combination of the inductor and the capacitor. The switching elements 224 are connected in parallel to each other. One end of each switching element 224 is electrically connected to the switching unit 222. The other end of each switching element 224 is electrically connected to the backboard 112. Through controlling the switching unit 222, the long portion A2 can be switched to connect with different switching elements 224. Since each switching element 224 has a different impedance, an operating frequency band of the long portion A2 can be adjusted through switching the switching unit 222, for example, the frequency band of the second mode of the long portion A2 can be offset towards a lower frequency or towards a higher frequency (relative to each other).

In this exemplary embodiment, to obtain preferred antenna characteristics, a width of the slot 118 can be 3.83 millimeter, that is a distance between the backboard 112 and the first radiating section 22, the second radiating section 24, and the third radiating section 26 can be 3.83 millimeter, thus to improve antenna characteristic for the radiating sections by being spaced apart from the backboard 112. A width of each of the gaps 1112, 1114, 1116, 1118 can be 2 millimeter, which may further improve antenna characteristic for the radiating sections.

Referring to FIG. 3, in this exemplary embodiment, the second radiating portion 16 is spaced apart from a side of the front camera 207. The first ground portion 27 is spaced apart from another side of the front camera 207. The second ground portion 28 is spaced apart from and between the dual backside cameras 202 and the receiver 203. The third radiating portion 18 is spaced apart from a side of the dual backside cameras 202.

Figure 5:
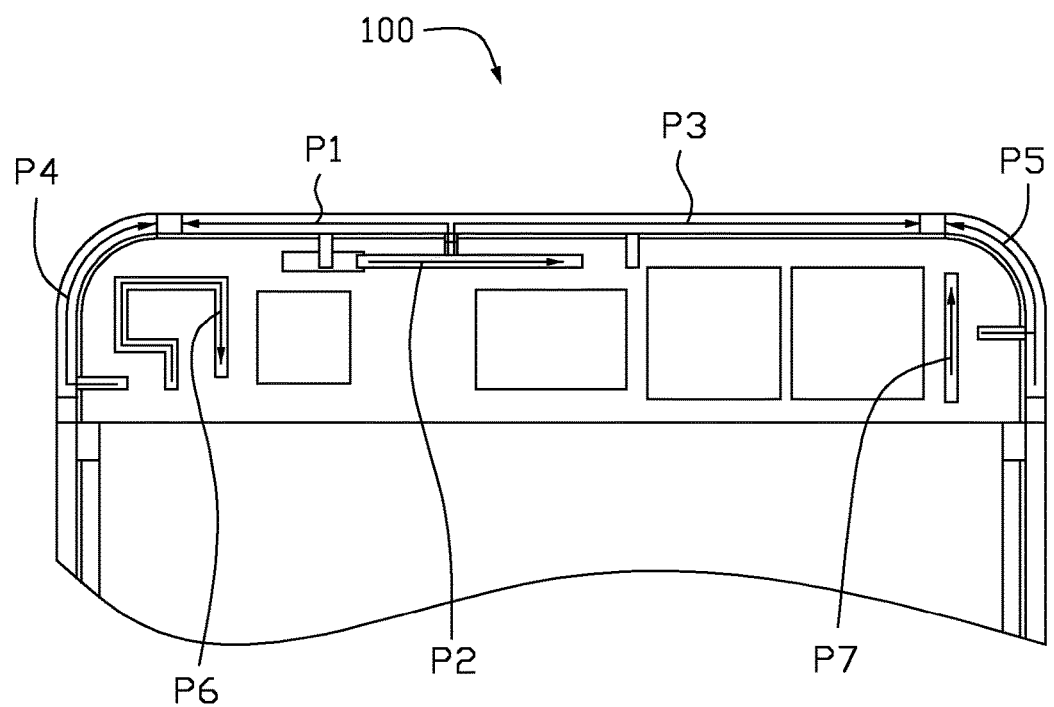
FIG. 5 is a current path distribution graph when the antenna structure of FIG. 1 is in operation.

Per FIG. 5, when the current enters the first radiating section 22 from the first feed portion 12, the current flows towards two direction, one direction flows through the short portion A1 and towards the first gap 1112 (please see a path P1), meanwhile the current is coupled to the first radiating portion 15 and flows opposite to the path P1 (please see a path P2). The current paths P1 and P2 cooperatively activate the LTE-A middle frequency mode. The current in the first radiating section 22, the other direction flows through the long portion A2 and towards the second gap 1114 (please see a path P3), thus, activating the LTE-A low frequency mode. Since the antenna structure 100 includes the switching circuit 20, the LTE-A low frequency mode of the long portion A2 can be switched through the switching circuit 20. When the current enters the second radiating section 24 from the second feed portion 13, the current flows through the second radiating section 24 and towards the first gap 1112 (please see a path P4), thus, activating the GPS mode. When the current enters the third radiating section 26 from the third feed portion 14, the current flows through the third radiating section 26 and towards the second gap 1114 (please see a path P5), thus, activating the WiFi 2.4G mode. When the current enters the second radiating portion 16 from the fourth feed portion 17, the current flows through the second radiating portion 16 along its extending direction (please see a path P6), thus, activating the LTE-A high frequency mode. When the current enters the third radiating portion 18 from the fifth feed portion 19, the current flows through the third radiating portion 18 along its extending direction (please see a path P7), thus, activating the WiFi 5G mode.

Figure 6:
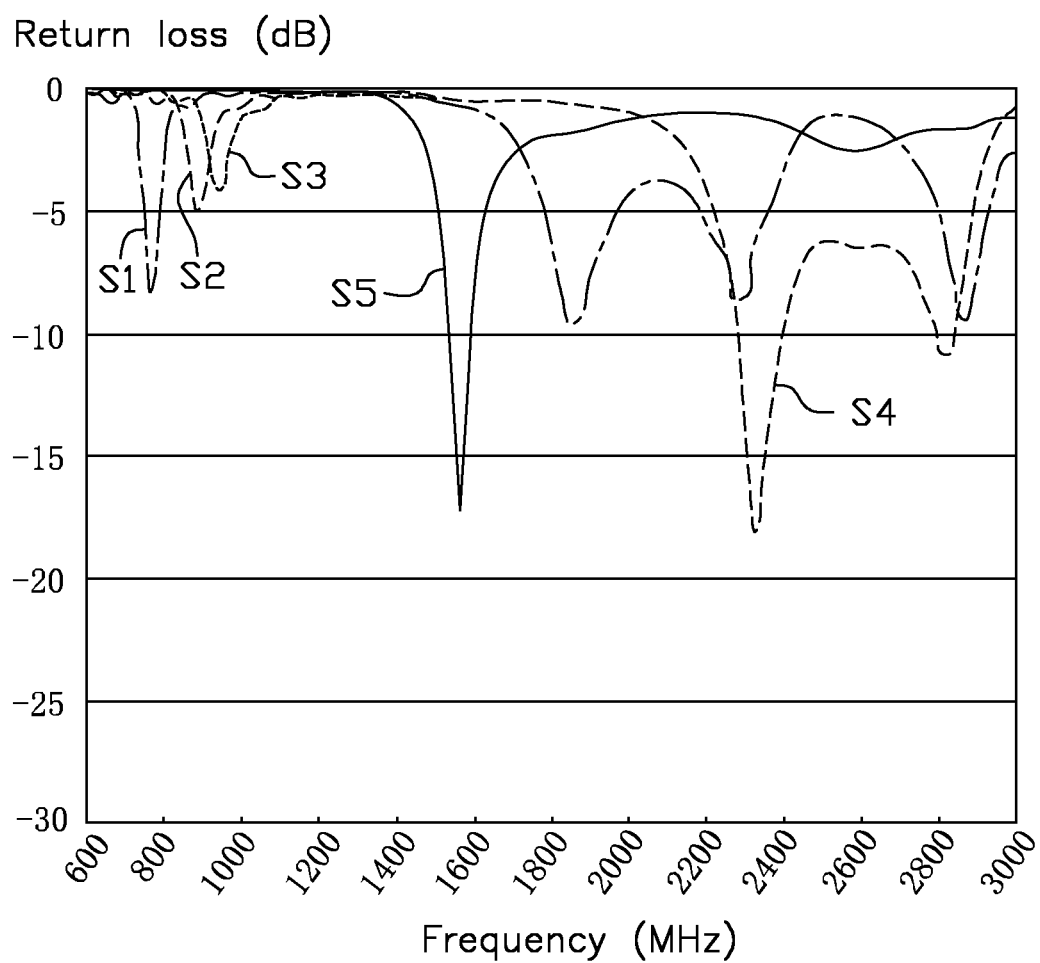
FIG. 6 is a return loss (RL) graph when the antenna structure of FIG. 1 is in operation.

FIG. 6 illustrates a return loss (RL) graph of the first diversity antenna, the second diversity antenna, and the GPS antenna when working. Curves S1, S2, S3 illustrate return losses when the long portion A2 operates at the LTE-A low frequency band. Curves S1, S2, S3 have different shapes due to the switching circuit 20 adjusting the frequency band. Curve S4 illustrates a return loss when the second radiating portion 16 operates at the LTE-A high frequency band (2300-2690 MHz). Curve S5 illustrates a return loss when the second radiating section 24 operates at the GPS frequency band (1575 MHz).

Figure 7:
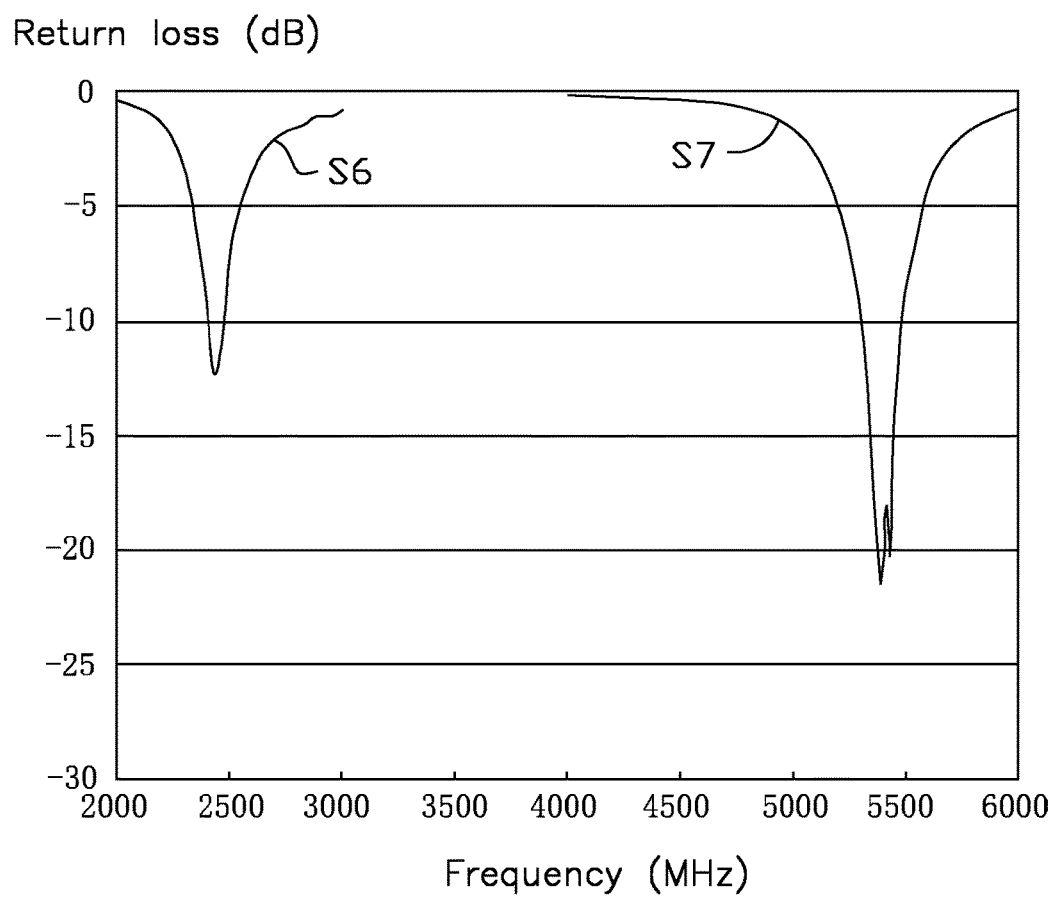
FIG. 7 is a return loss (RL) graph when the antenna structure of FIG. 1 operates at a WiFi 2.4G mode and a WiFi 5G mode.

FIG. 7 illustrates a return loss (RL) graph of the WiFi 2.4G antenna and the WiFi 5G antenna when working. Curve S6 illustrates a return loss when the third radiating section 26 operates at the WiFi 2.4G frequency band (2400-2484 MHz). Curve S7 illustrates a return loss when the third radiating portion 18 operates at the WiFi 5G frequency band (5150-5850 MHz).

Figure 8:
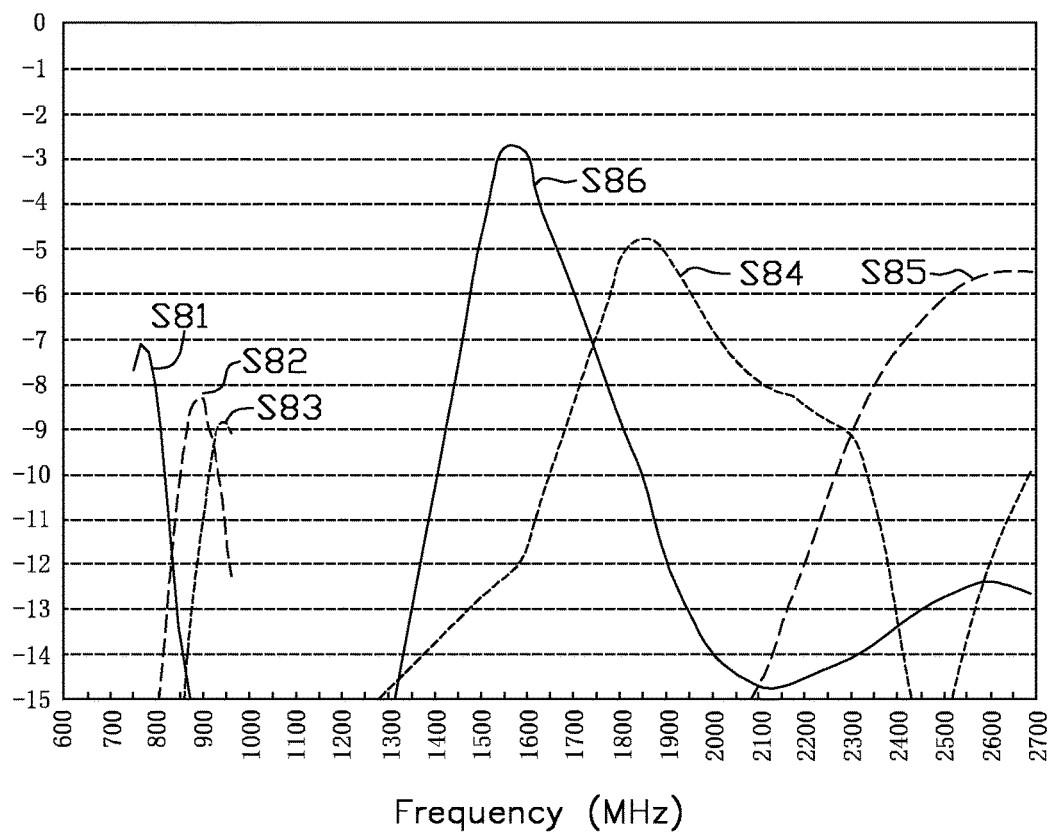
FIG. 8 is a radiating efficiency graph when the antenna structure of FIG. 1 operates at a LTE-A low frequency mode, a LTE-A middle frequency mode, a LTE-A high frequency mode, and a GPS mode.

FIG. 8 illustrates a radiating efficiency graph of the first diversity antenna, the second diversity antenna, and the GPS antenna when working. Curves S81, S82, S83 illustrate radiating efficiencies when the long portion A2 operates at the LTE-A low frequency band. Curves S81, S82, S83 have different shapes due to the switching circuit 20 adjusting the frequency band. Curve S84 illustrates a radiating efficiency when the second radiating portion 16 operates at the LTE-A middle frequency band (1805-2170 MHz). Curve S85 illustrates a radiating efficiency when the second radiating section 24 operates at the GPS frequency band (1575 MHz).

Figure 9:
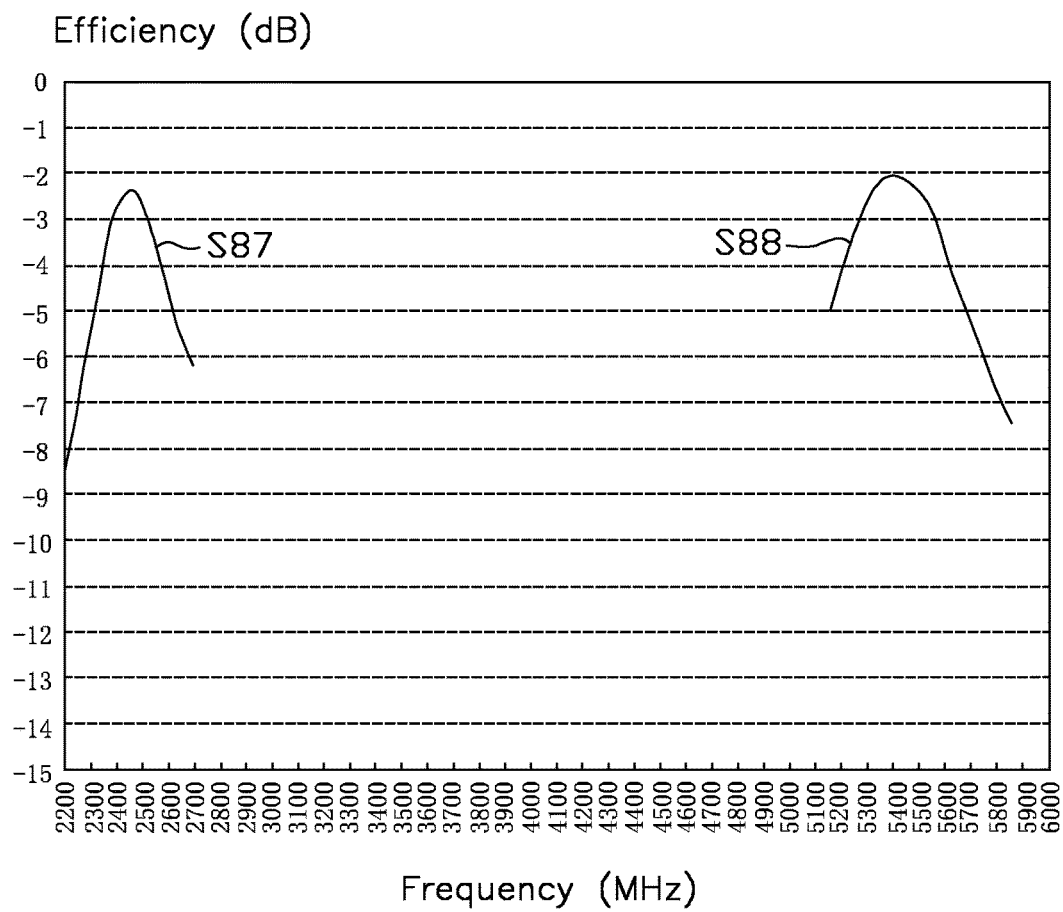
FIG. 9 is a radiating efficiency graph when the antenna structure of FIG. 1 operates at the WiFi 2.4G mode and the WiFi 5G mode.

FIG. 9 illustrates a radiating efficiency graph of the WiFi 2.4G antenna and the WiFi 5G antenna when working. Curve S87 illustrates a radiating efficiency when the third radiating section 26 operates at the WiFi 2.4G frequency band (2400-2484 MHz). Curve S88 illustrates a radiating efficiency when the third radiating portion 18 operates at the WiFi 5G frequency band (5150-5850 MHz).

Per FIGS. 5 to 8, the antenna structure 100 can work at a low frequency band, for example, LTE-A band 28 (703-803 MHz), LTE-A Band 5 (869-894 MHz), and LTE-A Band 8 (925-926 MHz), at a middle frequency band (1805-2170 MHz), and at a high frequency band (2300-2690 MHz). The antenna structure 100 can also work at the GPS frequency band (1575 MHz), WiFi 2.4G frequency band (2244-2484 MHz) and the WiFi 5G frequency band (5150-5850 MHz). That is, the antenna structure 100 can work at the low frequency band, the middle frequency band, and the high frequency band. When the antenna structure 100 operates at these frequency bands, a working frequency satisfies a design of the antenna and also has a good radiating efficiency.

The antenna structure 100 includes the metallic member 11 and the backboard 112. The metallic member 11 defines the slot on the side frame 113 and the gaps on the front frame 111. The backboard 112 is an integrally formed metallic sheet without other slot, break line, and/or gap, which maintains integrity and aesthetics.

Figure 10:
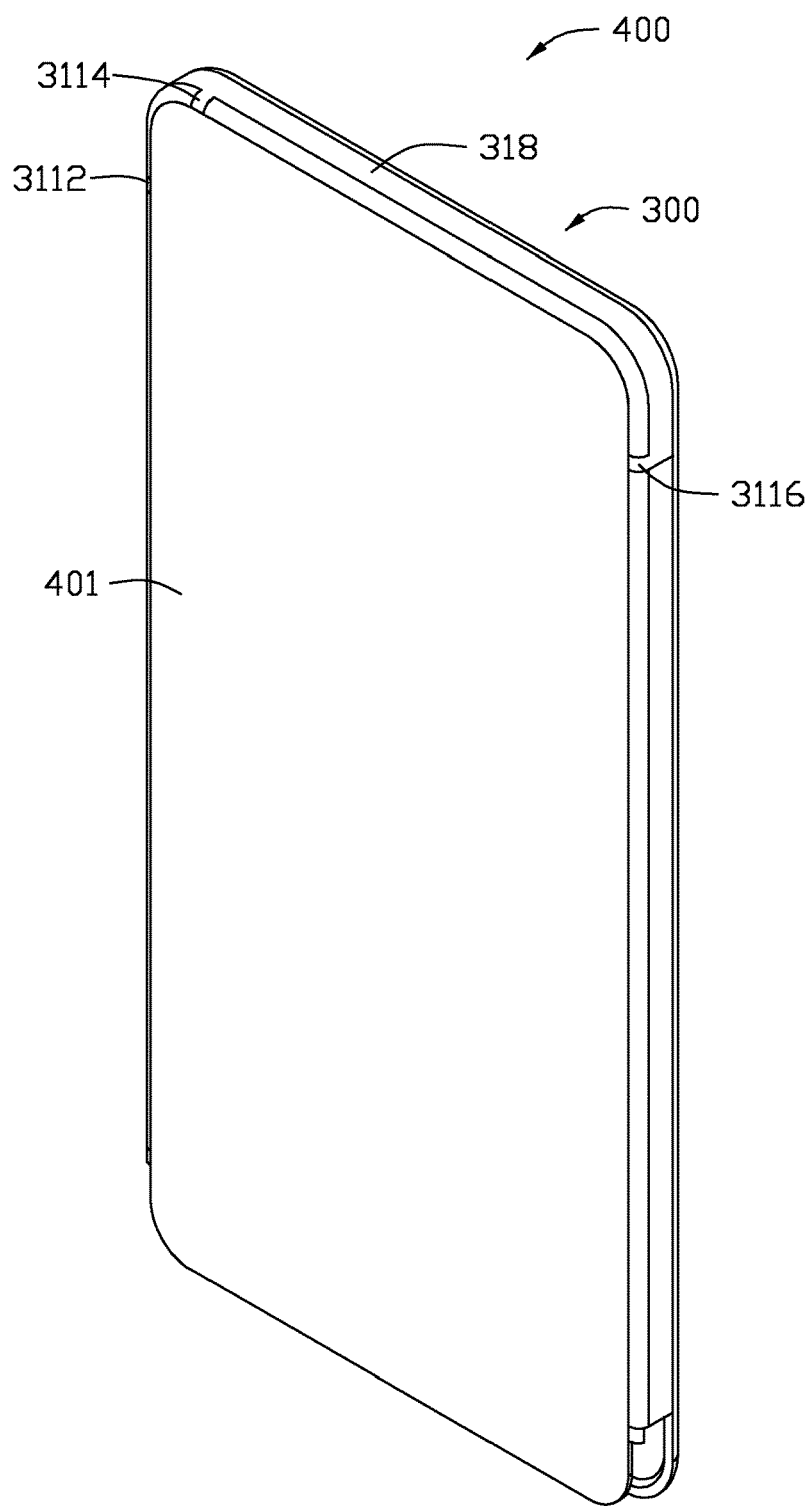
FIG. 10 is an isometric view of a second exemplary embodiment of a wireless communication device using a second exemplary antenna structure.

FIG. 10 illustrates a second embodiment of a wireless communication device 400 using a second exemplary antenna structure 300. The wireless communication device 400 can be a mobile phone or a personal digital assistant, for example. The antenna structure 300 can receive or send wireless signals.

Figure 11:
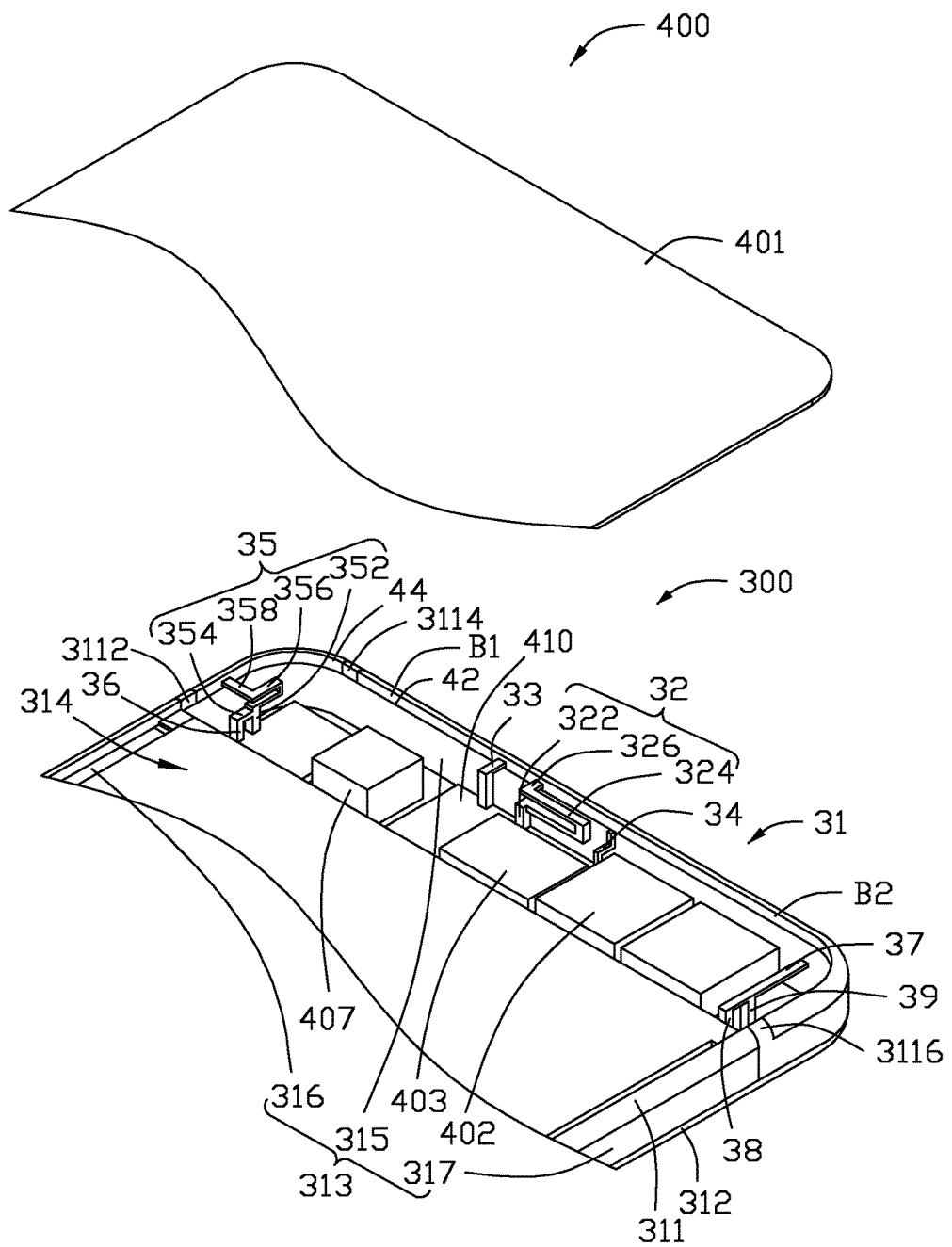
FIG. 11 is detailed view of the antenna structure of the wireless communication device of FIG. 10.
Figure 14:
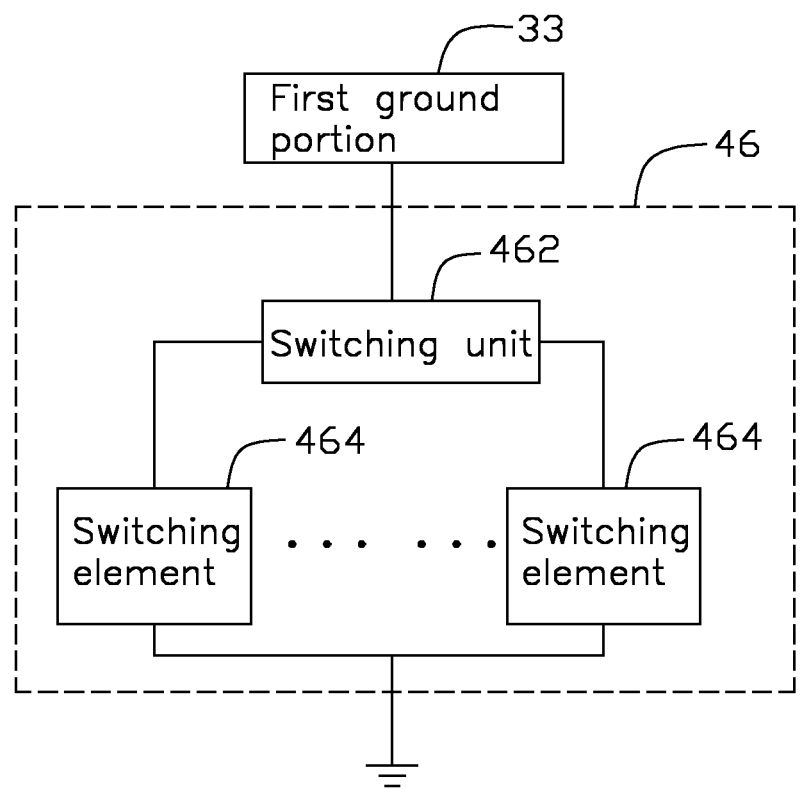
FIG. 14 is a circuit diagram of a switching circuit of the antenna structure of FIG. 10.

Per FIG. 11, the antenna structure 300 includes a metallic member 31, a first feed portion 32, a first ground portion 33, a second ground portion 34, a second feed portion 35, a third ground portion 36, a radiating portion 37, a third feed portion 38, a fourth ground portion 39, a first switching circuit 46 (shown in FIG. 14), and a second switching circuit 47 (shown in FIG. 14).

The metallic member 31 can be a metal housing of the wireless communication device 400. In this exemplary embodiment, the metallic member 31 is a frame structure and includes a front frame 311, a backboard 312, and a side frame 313 as shown in FIG. 10. The front frame 311, the backboard 312, and the side frame 313 can be integral with each other. The front frame 311, the backboard 312, and the side frame 313 cooperatively form the metal housing of the wireless communication device 400. The front frame 311 defines an opening (not shown) thereon. The wireless communication device 400 includes a display 401. The display 401 is received in the opening. The display 401 has a display surface. The display surface is exposed at the opening and is positioned parallel to the backboard 312.

Figure 12:
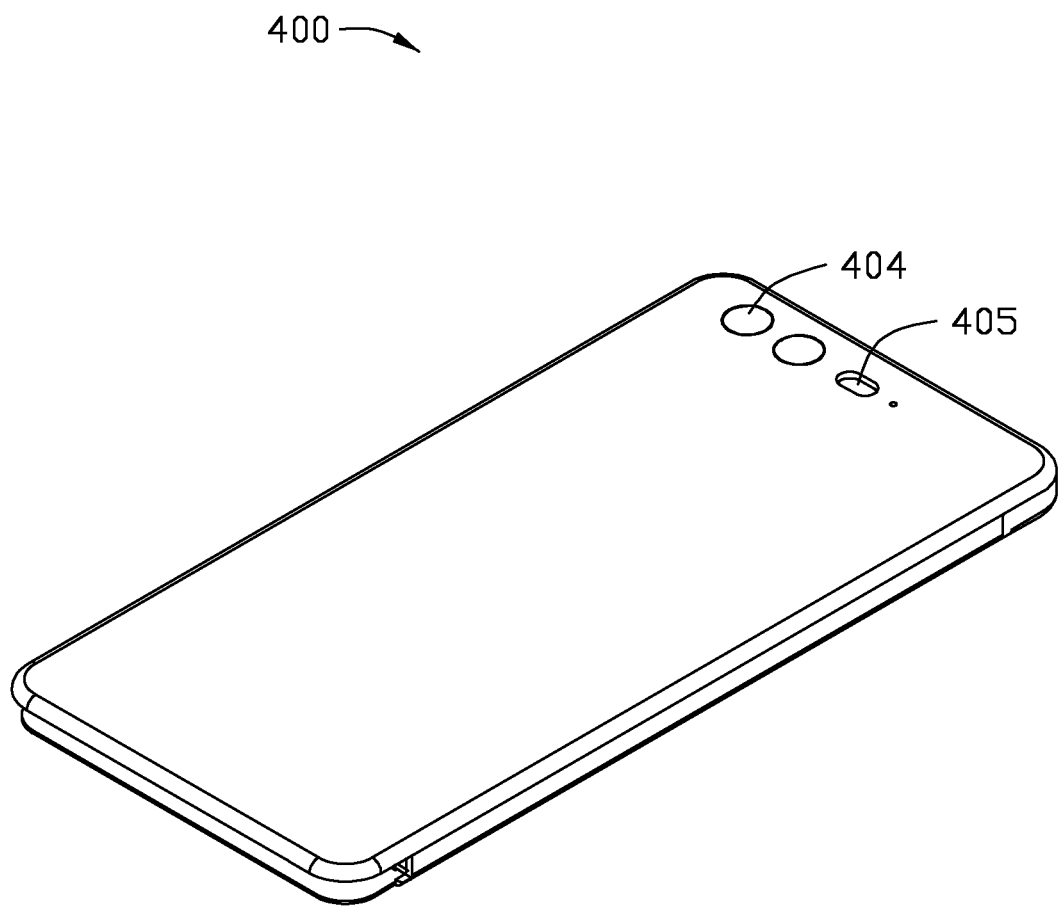
FIG. 12 is a detail view of the antenna structure of FIG. 10.

The backboard 312 is positioned opposite to the front frame 311. The backboard 312 is coupled to the side frame 313, and there is no gap between the backboard 312 and the side frame 313. The backboard 312 is an integrally formed metallic sheet. Except the holes 404, 405 for exposing dual backside cameras 402 and a receiver 403, the backboard 312 does not define any other slot, break line, and/or gap. The backboard 312 serves as a ground of the antenna structure 300 as shown in FIG. 12.

The side frame 313 is positioned between the front frame 311 and the backboard 312. The side frame 313 is positioned around a periphery of the front frame 311 and a periphery of the backboard 312. The side frame 313 forms a receiving space 314 together with the display 401, the front frame 311, and the backboard 312. The receiving space 314 can receive a print circuit board 410, a processing unit (not shown), or other electronic components or modules. In this exemplary embodiment, the electronic components or modules at least include the dual backside cameras 402, the receiver 403, and a front camera 407. The dual backside cameras 402, the receiver 403, and the front camera 407 are arranged on the print circuit board 410 and spaced apart from each other.

Referring to FIG. 1, the side frame 313 includes a top portion 315, a first side portion 316, and a second side portion 317. The top portion 315 connects the front frame 311 and the backboard 312. The first side portion 316 is spaced apart from and parallel to the second side portion 317. The top portion 315 has first and second ends. The first side portion 316 is connected to the first end of the first frame 311 and the second side portion 317 is connected to the second end of the top portion 315. The first side portion 316 connects the front frame 311 and the backboard 312. The second side portion 317 also connects the front frame 311 and the backboard 312. The side frame 313 defines a slot 318. In this exemplary embodiment, the slot 318 is defined at the top portion 315 and extends to the first side portion 316 and the second side portion 317. In other exemplary embodiments, the slot 318 can only be defined at the top portion 315 and does not extend to any one of the first side portion 316 and the second side portion 317. In other exemplary embodiments, the slot 318 can be defined only at the top portion 315, but not extending to any of the first side portion 316 and the second side portion 317. In other exemplary embodiments, the slot 318 can be defined at the top portion 315 and extends to one of the first side portion 316 and the second side portion 317.

Referring to FIG. 11, the front frame 311 includes a top arm (not labeled) corresponding to the top portion 315 and two side arms (not labeled) corresponding to the first side portion 316 and the second side portion 317. The front frame 311 defines a first gap 3112 and a third gap 3116 at the two side arms, respectively, and a second gap 3114 at the top arm. The first gap 3112 and the third gap 3116 are defined on opposite ends of the slot 318. The gaps 3112, 3114, 3116 are in air communication with the slot 318 and extend across the front frame 311. The front frame 311 is divided by the gaps 3112, 3114, 3116 into three portions, which are a first radiating section 42 and a second radiating section 44. In this exemplary embodiment, the second gap 3114 is defined on the top arm of the front frame 311. The first gap 3112 and the second gap 3114 are respectively disposed adjacent to corners on an end of the top arm. The first radiating section 42 is formed between the second gap 3114 and the third gap 3116, extends from the top arm to a side arm of the front frame 311, and crosses an arc corner (not shown). The second radiating section 44 is formed between the first gap 3112 and the second gap 3116, extends from the top arm to another side arm of the front frame 311, and crosses another arc corner (not shown). A length of the first radiating section 42 is greater than the second radiating section 44. In this exemplary embodiment, the slot 318 and the gaps 3112, 3114, 3116 are filled with insulating material, for example, plastic, rubber, glass, wood, ceramic, or the like, thereby isolating the first radiating section 42, the second radiating section 44, and the backboard 312.

In this exemplary embodiment, except for the slot 318 and the gaps 3112, 3114, 3116, an upper half portion of the front frame 311 and the side frame 313 does not define any other slot, break line, and/or gap. That is, there are only the gaps 3112, 3114, 3116 defined on the upper half portion of the front frame 311.

Referring to FIG. 11, one end of the first feed portion 32 is electrically connected to an end the first radiating section 42 and is adjacent to the second gap 3114, the other end of the first feed portion 32 is electrically connected to a feeding source, which may feed current into the first radiating section 42. In this exemplary embodiment, after the current is fed into the first feed portion 32, the current flows towards the second gap 3114 and the third gap 3116 along the first radiating section 42. Thus, the first radiating section 42 is divided into a short portion B1 and a long portion B2 by a connecting point of the first feed portion 32. The short portion B1 extends towards the second gap 3114 and the long portion B2 extends towards the third gap 3116 from the connecting point of the first feed portion 32. In this exemplary embodiment, the connecting point of the first feed portion 32 is not positioned at a middle portion of the first radiating section 42. The long portion B2 is longer than the short portion B1.

The first radiating section 42 connects to the first ground portion 33 and the second ground portion 34. The first ground portion 33 and the second ground portion 34 are on opposite sides of the first feed portion 32. Per FIGS. 11 and 13, the first ground portion 33 connects to the short portion B1, the second ground portion 34 connects to the long portion B2. The first feed portion 32 includes a first arm 322, a second arm 324, and a third arm 326. The second arm 324 is substantially U-shaped and substantially perpendicularly connects to the first arm 322 and the third arm 326 on two ends. The first arm 322 and the second arm 324 are spaced apart from the first radiating section 42, the third arm 326 connects to the second arm 324 and the first radiating section 42. The first ground portion 33 and the second ground portion 34 are both substantially L-shaped.

The short portion B1 activates a first mode to generate radiation signals in a first frequency band, the long portion B2 activates a second mode to generate radiation signals in a second frequency band, the long portion B2 and the short portion B1 cooperatively activates a third mode to generate radiation signals in a third frequency band. In this exemplary embodiment, the first mode is a LTE-A (Long Term Evolution Advanced) middle frequency operation mode, the first frequency band is a frequency band of about 1575-2170 MHz. The second mode is a LTE-A low frequency operation mode, the second frequency band is a frequency band of about 703-960 MHz. The third mode is a GPS mode, the third frequency band is a frequency band of about 1575 MHz. The first radiating section 42, the first feed portion 32, the first ground portion 33, and second ground portion cooperatively form a first diversity/GPS antenna, which resonating radiation signals in the LTE-A low frequency mode, the LTE-A middle frequency mode, and the GPS mode.

The first switching circuit 46 and the second switching circuit 47 are both arranged on the circuit board 410. Per FIG. 14, one end of the first switching circuit 46 connects to the first ground portion 33, the other end connects to a ground; one end of the second switching circuit 47 connects to the second ground portion 34, the other end connects to the ground. The backboard 312 serves as the ground of the antenna structure 300. Perhaps, a middle frame or a shielding mask (not shown) also may serves as the ground of the antenna structure 300, the middle frame can be a shielding mask for shielding electromagnetic interference arranged on the display 401 facing the backboard 312. The shielding mask or the middle frame can be made of metal material. The shielding mask or the middle frame may connect to the backboard 312 to form a greater ground for the antenna structure 300. In summary, each ground portion directly or indirectly connects to the ground.

The first switching circuit 46 includes a switching unit 462 and a plurality of switching elements 464. The switching unit 462 is electrically connected to the first ground portion 33. The switching elements 464 can be an inductor, a capacitor, or a combination of the inductor and the capacitor. The switching elements 464 are connected in parallel to each other. One end of each switching element 464 is electrically connected to the switching unit 462. The other end of each switching element 464 is electrically connected to the backboard 312. Through controlling the switching unit 462, the short portion B1 can be switched to connect with different switching elements 464. Since each switching element 464 has a different impedance, an operating frequency band of the short portion B1 can be adjusted through switching the switching unit 462, for example, the frequency band of the first mode of the short portion B1 can be offset towards a lower frequency or towards a higher frequency (relative to each other). The second switching circuit 47 is substantially similar to the first switching circuit 46 and configured to offset the frequency band of the second mode of the long portion B2. The LTE-A low frequency band mode may cover 703-804 MHz, 824-894 MHz, and 880-960 MHz by offsetting the impedance of the second switching circuit 47.

One end of the second feed portion 35 connects to the second radiating section 44 and is adjacent to the first gap 3112. The second feed portion 35 includes a fourth arm 352, a fifth arm 354, a sixth arm 356, and a seventh arm 358. The third ground portion 36 is substantially straight arm and connected to the ground. The fourth arm 352 is spaced apart from and parallel to the third ground portion 36. The fifth arm 354 is connected between the fourth arm 352 and the third ground portion 36. The sixth arm 356 is substantially U-shaped and connects to the fifth arm 354 and the seventh arm 358 on opposite ends, the end of the sixth arm 356 connecting the fifth arm 354 further connects to the fourth arm 352, the fifth arm 354 extends along the sixth arm 356 extending direction. The fourth arm 352, the fifth arm 354, the sixth arm 356, and the third ground portion 36 are spaced apart from the second radiating section 44, the seventh arm 358 is connected between the sixth arm 356 and the second radiating section 44. The second feed portion 35 feeds current into the second radiating section 44 to cooperatively activate a fourth mode to generate radiation signals in a fourth frequency band. In this exemplary embodiment, the fourth mode is a LTE-A high frequency mode, the fourth frequency band is a frequency band of about 2300-2690 MHz. Additionally, the fourth mode further includes a fifth mode, the fifth mode is a WiFi 2.4G mode, the fourth frequency band includes a fifth frequency band, the fifth frequency band is a WiFi 2.4G frequency band, the WiFi 2.4G frequency band is a frequency band of about 2400-2484 MHz. The second radiating section 44, the second feed portion 35, and the third ground portion 36 cooperatively form a second diversity/WiFi 2.4G antenna resonating radiation signals covering the LTE-A high frequency band and the WiFi 2.4G frequency band.

The radiating portion 37 is positioned among and spaced apart from the dual backside cameras 402, the long portion B2, and the third gap 3116. The radiating portion 37, the third feed portion 38, and the fourth ground portion 39 are substantially straight. The third feed portion 38 is parallel to and spaced apart from the fourth ground portion 39. The radiating portion 37 connects to a same side of the third feed portion 38 and the fourth ground portion 39 and extends towards the top arm of the front frame 311. The fourth ground portion 39 connects to the ground. The third feed portion 38 feeds current into the radiating portion 37 to cooperatively activate a sixth mode to generate radiation signals in a sixth frequency band. In this exemplary embodiment, the sixth mode is a WiFi 5G mode, the sixth frequency band is a frequency band of about 5150-5850 MHz. The radiating portion 37, the third feed portion 38, and the fourth ground portion 39 cooperatively form a WiFi 5G antenna resonating radiation signals covering the WiFi 5G frequency band.

In this exemplary embodiment, to obtain preferred antenna characteristics, a width of the slot 318 can be 3.83 millimeter, that is a distance between the backboard 312 and the first radiating section 42 and the second radiating section 44 can be 3.83 millimeter, the width of the slot 318 can be adjusted in a range of about 3-4.5 millimeter, thus to improve antenna characteristic for the radiating sections by being spaced apart from the backboard 312. A width of each of the gaps 3112, 3114, 3116 can be 2 millimeter and can be adjusted in a range of about 1.5-2.5 millimeter, which may further improve antenna characteristic for the radiating sections.

Figure 13:
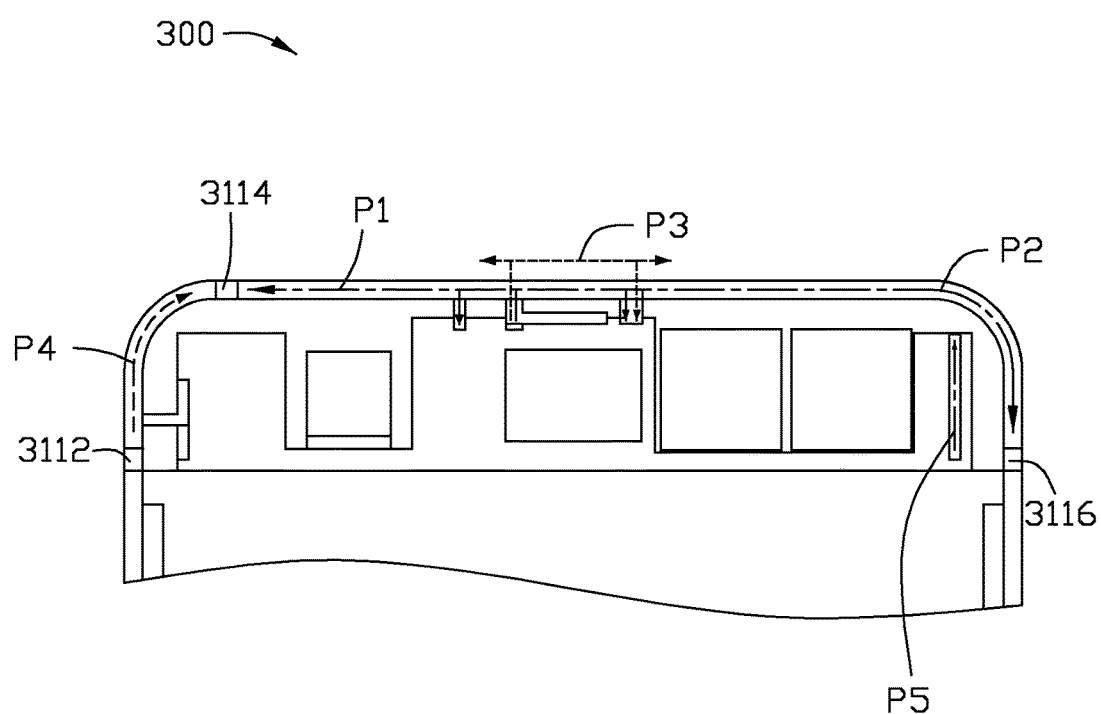
FIG. 13 is a current path distribution graph when the antenna structure of FIG. 10 is in operation.

Per FIG. 13, when the current enters the first radiating section 42 from the first feed portion 32, the current flows towards two direction, one direction flows through the short portion B1 and towards the second gap 3114 and the first ground portion 33 (please see a path P1), thus, activating the LTE-A middle frequency mode. When the current enters the first radiating section 42 from the first feed portion 32, another direction flows through the long portion B2 and towards the third gap 3116 (please see a path P2), thus, activating the LTE-A low frequency mode. Meanwhile, when the current enters the first radiating section 42 from the first feed portion 32 and flows both through the short portion B1 towards the second gap 3114 and through the long portion B2 towards the third gap 3116 and the second ground portion 34 (please see a path P3), thus, activating the GPS mode. When the current enters the second radiating section 44 from the second feed portion 35, the current flows through the second radiating section 44 and towards the second gap 3114 (please see a path P4), thus, activating the LTE-A high frequency mode and the WiFi 2.4G mode. When the current enters the radiating portion 37 from the third feed portion 38, the current flows thought the radiating portion 37 along its extending direction (please see a path P5), thus, activating the WiFi 5G mode.

Figure 15:
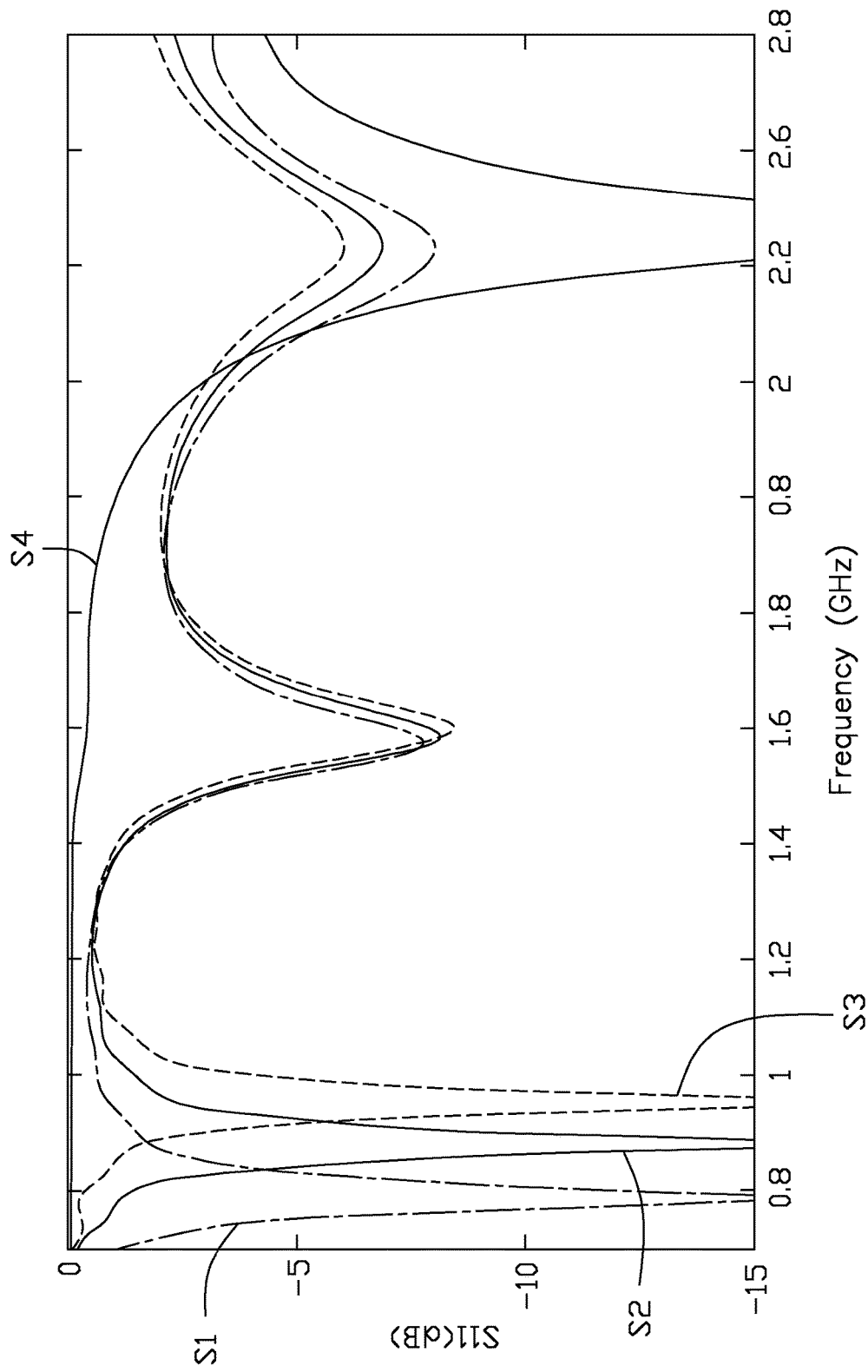
FIG. 15 is a scattering parameter graph when the antenna structure of FIG. 10 operates at a LTE-A low frequency mode, a LTE-A middle frequency mode, a LTE-A high frequency mode, and a GPS mode.

FIG. 15 illustrates a scattering parameter graph of the first diversity/GPS antenna and the second diversity/WiFi 2.4G antenna when working. Curves S1, S2, S3 illustrate scattering parameters of the first diversity/GPS antenna and the second diversity/WiFi 2.4G antenna though the adjust of the first switching circuit 46 and the second switching circuit 47 and operates at the LTE-A low frequency band (703-960 MHz), the GPS frequency band (1575 MHz), and the LTE-A middle frequency band (1575-2170 MHz). Curve S4 illustrates a scattering parameter of the first diversity/GPS antenna and the second diversity/WiFi 2.4G antenna operates at the WiFi 2.4G frequency band (2400-2484 MHz).

Figure 16:
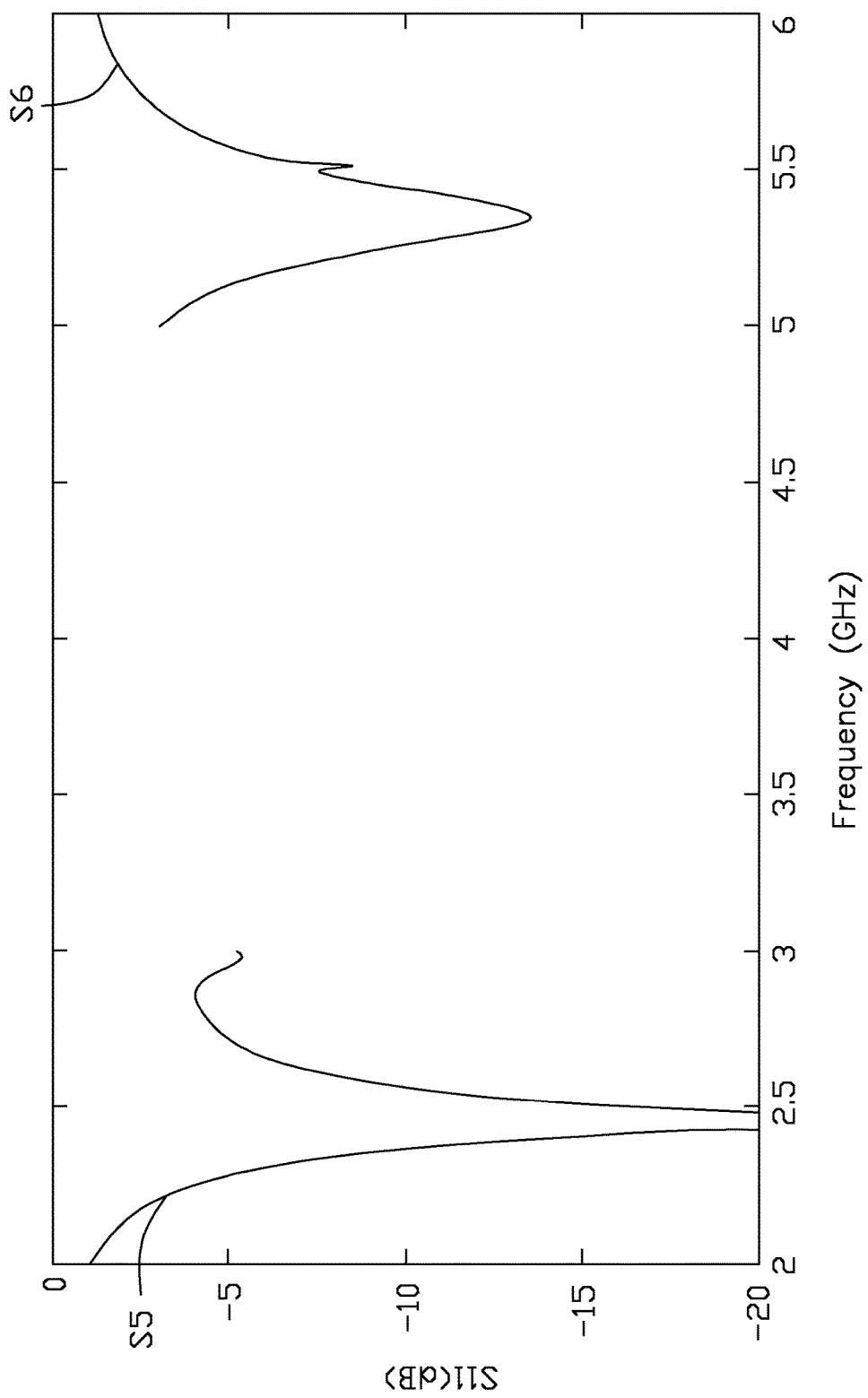
FIG. 16 is a scattering parameter graph when the antenna structure of FIG. 10 operates at a WiFi 2.4G mode and a WiFi 5G mode.

FIG. 16 illustrates a scattering parameter graph of the second diversity/WiFi 2.4G antenna and the WiFi 5G antenna when working. Curve S5 in FIG. 16 is the same as the curve S4 of FIG. 15. Curve S6 illustrates a scattering parameter of the radiating portion 37 operates at the WiFi 5G frequency band (5150-5850 MHz).

Figure 17:
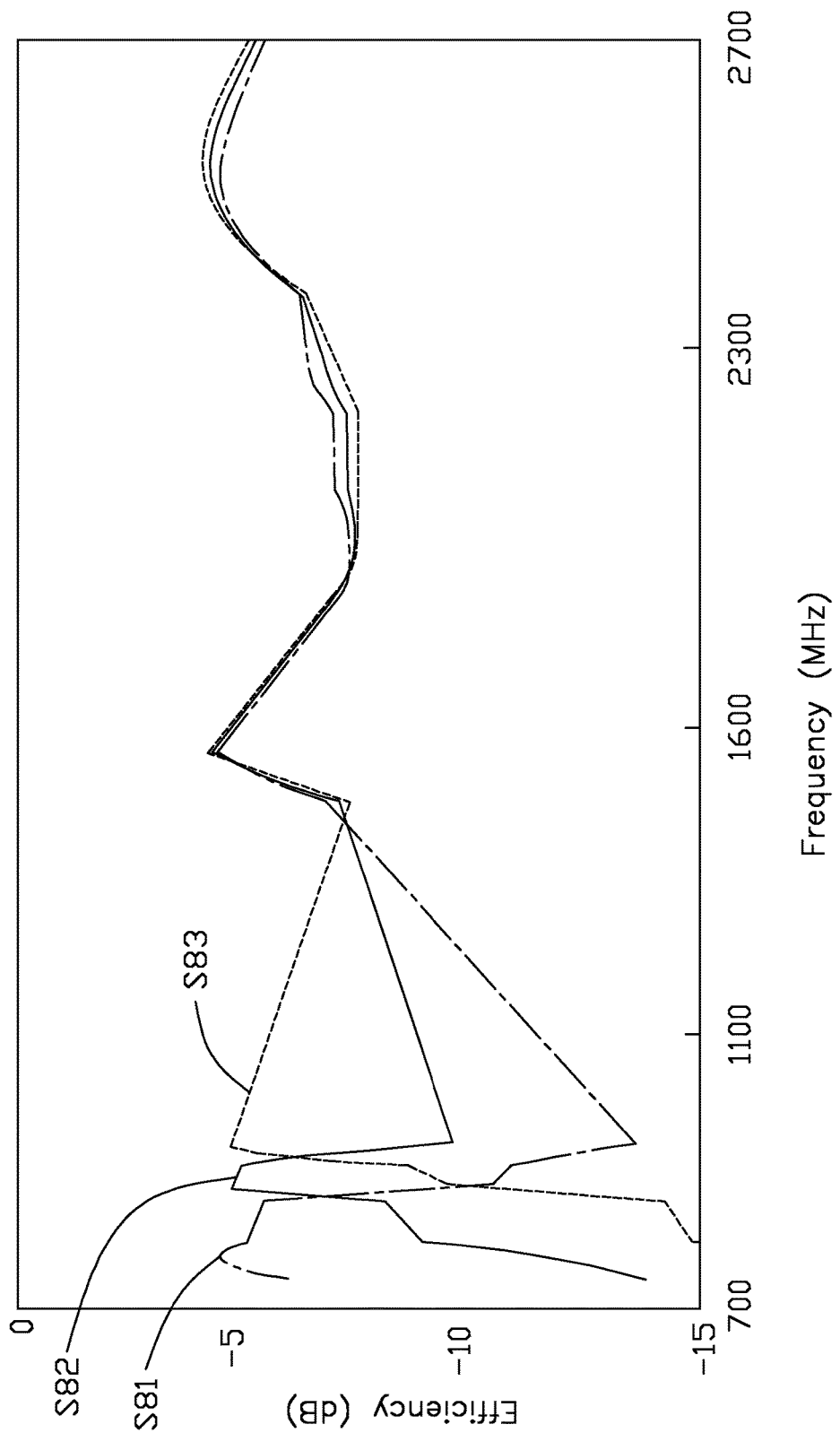
FIG. 17 is a radiating efficiency graph when the antenna structure of FIG. 10 operates at the LTE-A low frequency mode, the LTE-A middle frequency mode, the LTE-A high frequency mode, and the GPS mode.

FIG. 17 illustrates a radiating efficiency graph of the first diversity/GPS antenna and the second diversity/WiFi 2.4G antenna when working. Curves S81, S82, S83 illustrate radiating efficiencies of the first diversity/GPS antenna and the second diversity/WiFi 2.4G antenna operates at different frequency bands though the adjust of the first switching circuit 46 and the second switching circuit 47.

Figure 18:
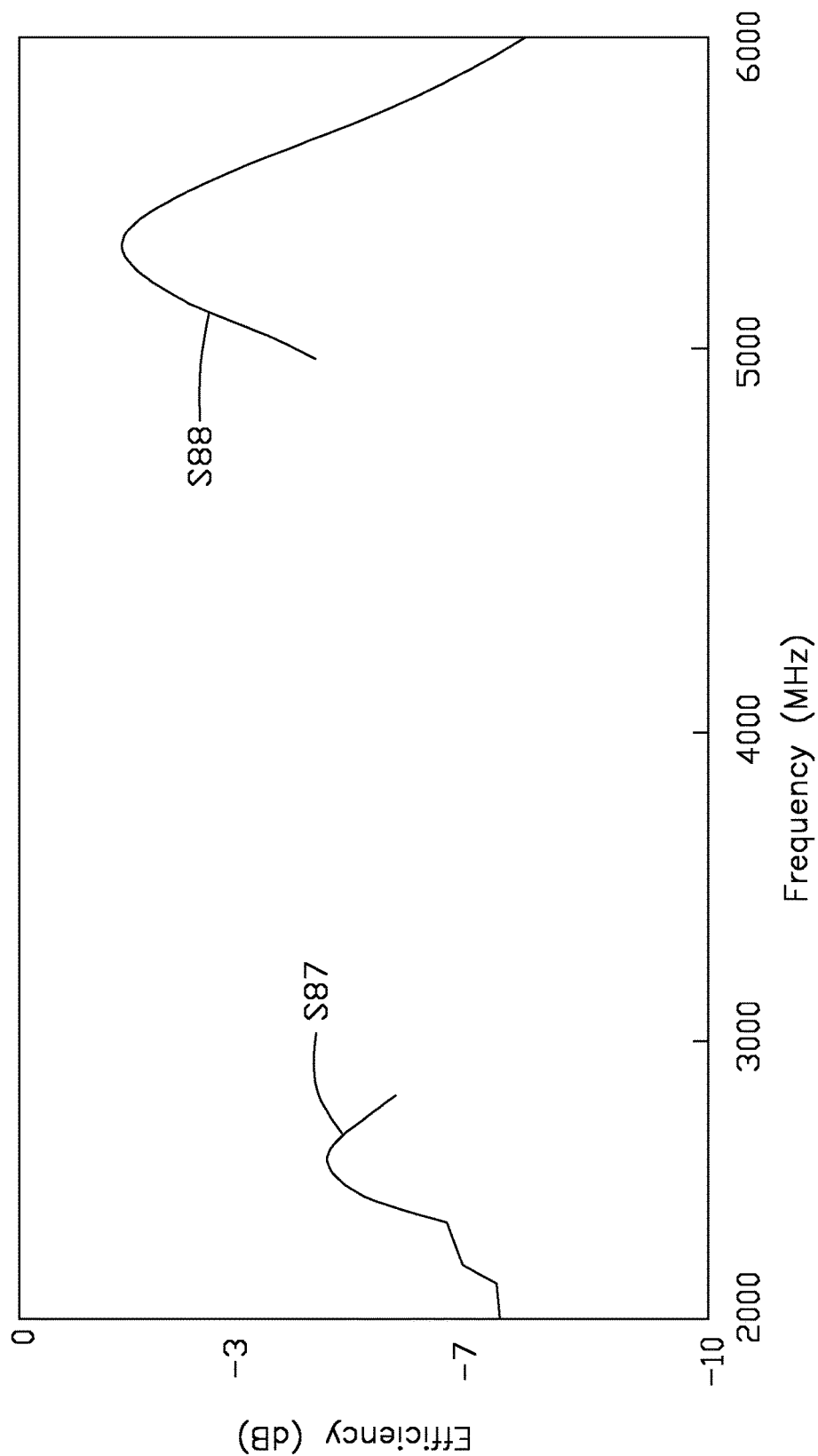
FIG. 18 is a radiating efficiency graph when the antenna structure of FIG. 10 operates at the WiFi 2.4G mode and the WiFi 5G mode.

FIG. 18 illustrates a radiating efficiency graph of the second diversity/WiFi 2.4G antenna and the WiFi 5G antenna when working. Curve S87 illustrates a radiating efficiency of the second radiating section 44 operates at the WiFi 2.4G frequency band (2400-2484 MHz). Curve S88 illustrates a radiating efficiency of the radiating portion 37 operates at the WiFi 5G frequency band (5150-5850 MHz).

Per FIGS. 15 to 18, the first diversity/GPS antenna, the second diversity/WiFi 2.4G antenna, and the WiFi 5G antenna can work at a low frequency band, for example, LTE-A low frequency band (703-960 MHz), at a middle frequency band (1575-2170 MHz), and at a high frequency band (2300-2690 MHz). The antenna structure 300 can also work at the GPS frequency band (1575 MHz), WiFi 2.4G frequency band (2044-2484 MHz) and the WiFi 5G frequency band (5150-5850 MHz). That is, the antenna structure 300 can work at the low frequency band, the middle frequency band, and the high frequency band. When the antenna structure 300 operates at these frequency bands, a working frequency satisfies a design of the antenna and also has a good radiating efficiency.

The antenna structure 300 includes the metallic member 31 and the backboard 312. The metallic member 31 defines the slot on the side frame 313 and the gaps on the front frame 311. The backboard 312 is an integrally formed metallic sheet without other slot, break line, and/or gap, which maintains integrity and aesthetics.

Figure 19:
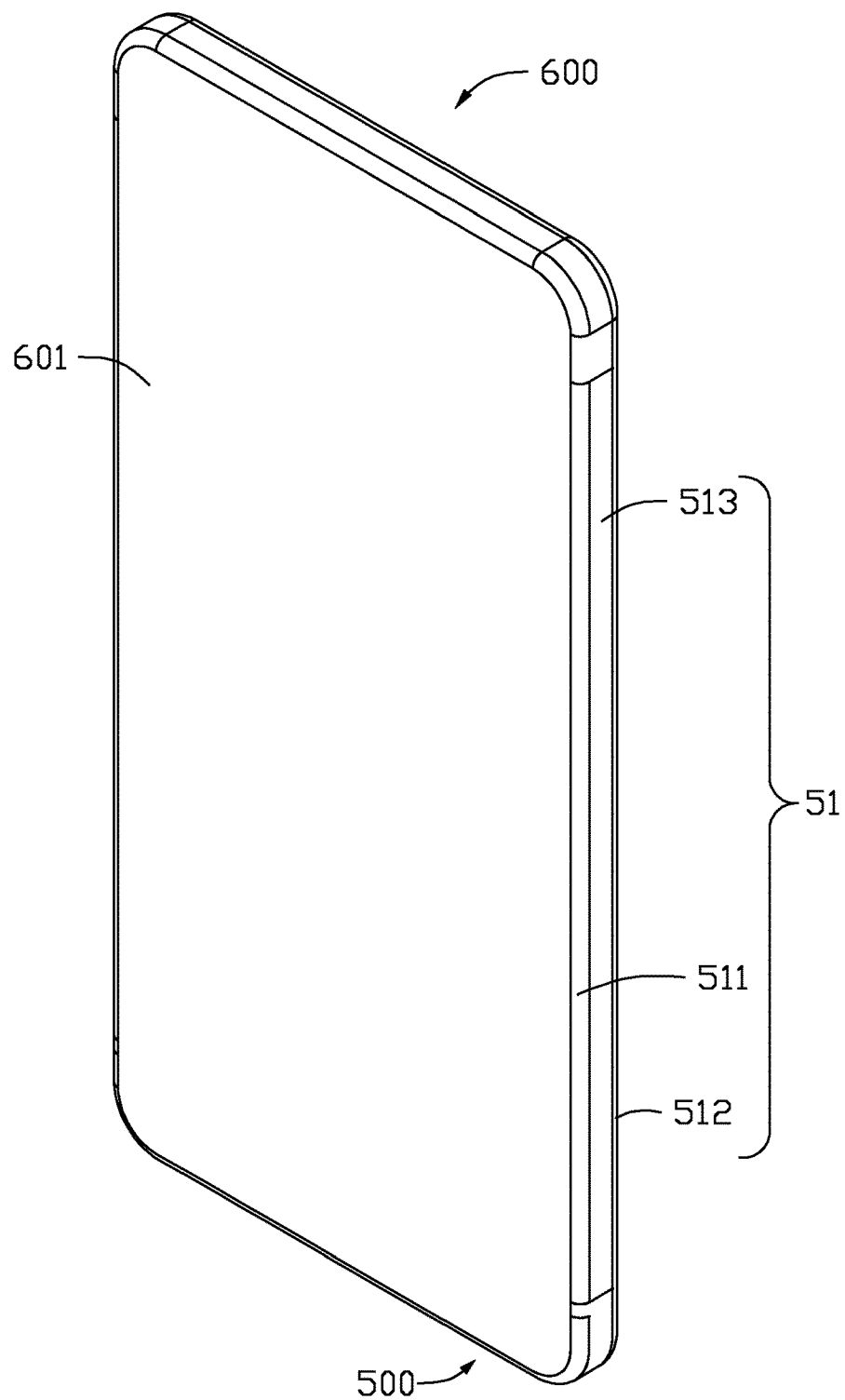
FIG. 19 is an isometric view of a third exemplary embodiment of the wireless communication device using a third exemplary antenna structure.

FIG. 19 illustrates a third embodiment of a wireless communication device 600 using a third exemplary antenna structure 500. The wireless communication device 600 can be a mobile phone or a personal digital assistant, for example. The antenna structure 500 can receive or send wireless signals.

Figure 20:
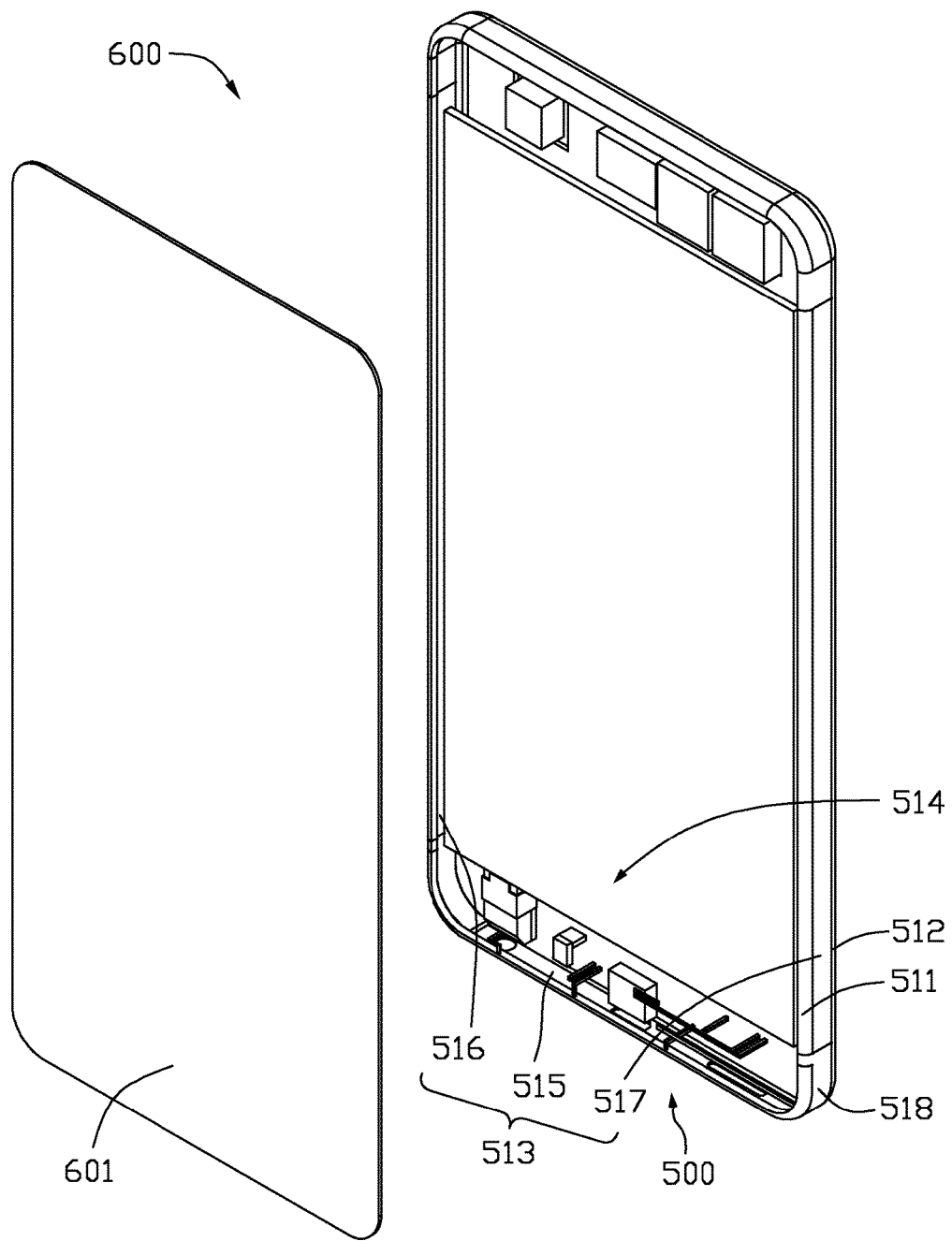
FIG. 20 is another isometric view of the wireless communication device of FIG. 19.
Figure 21:
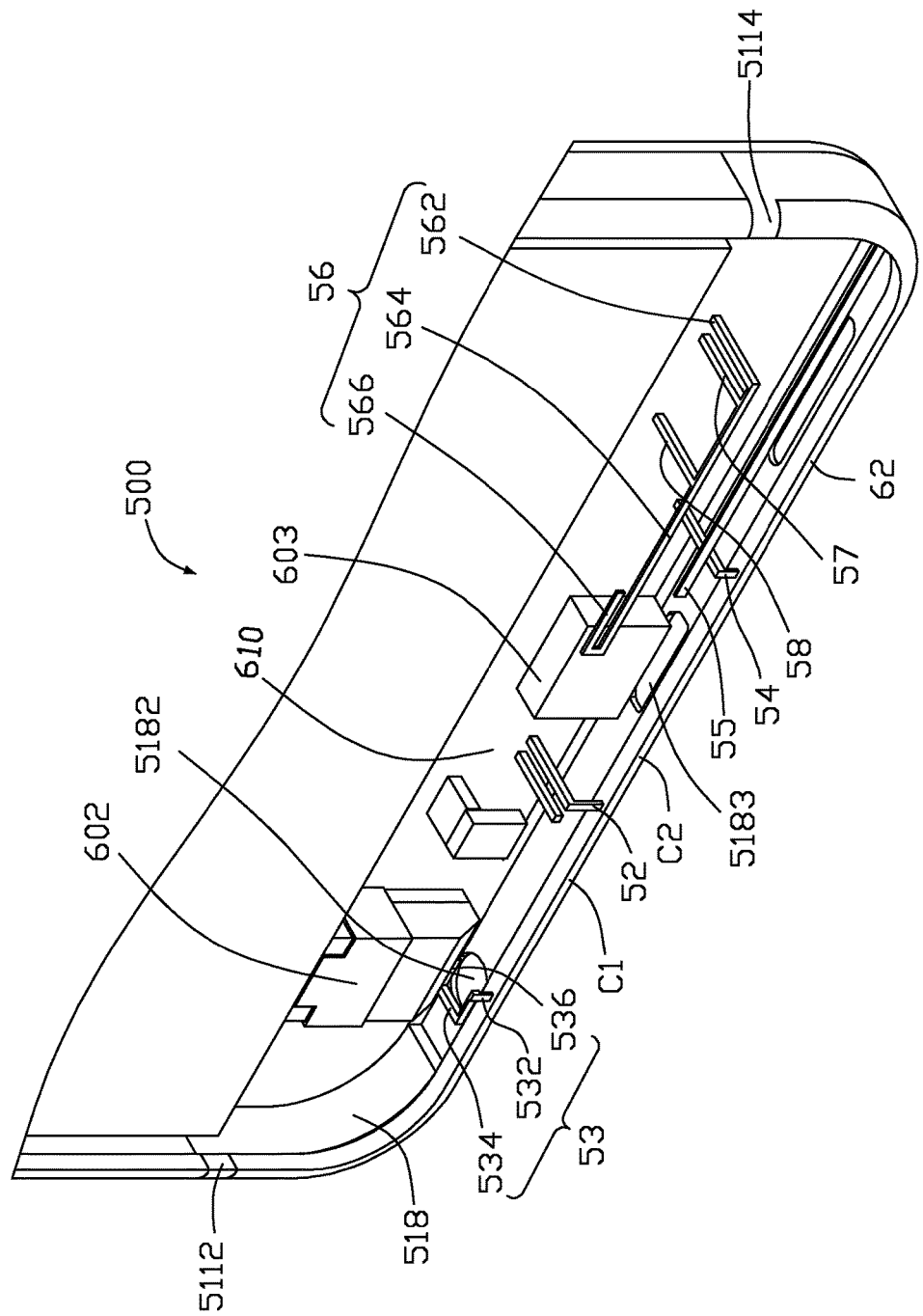
FIG. 21 is a detailed view of the antenna structure of the wireless communication device of FIG. 20.
Figure 22:
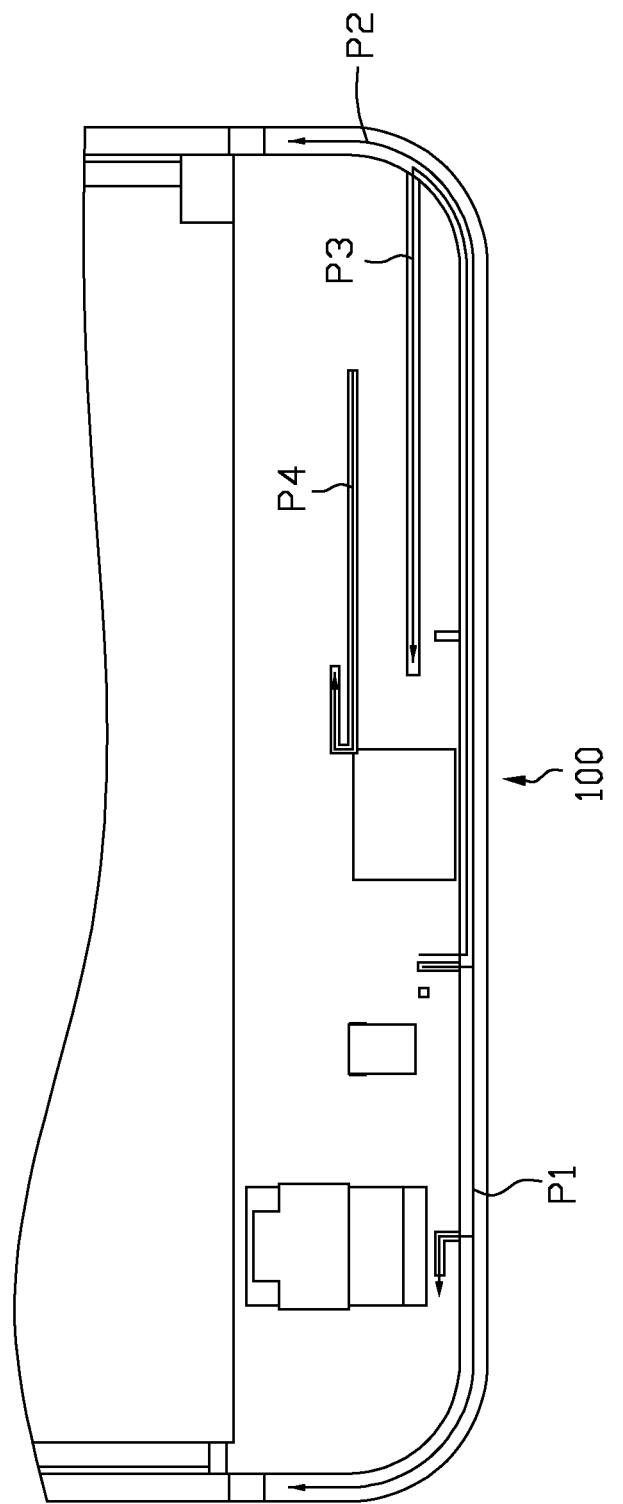
FIG. 22 is a current path distribution graph when the antenna structure of FIG. 19 is in operation.
Figure 23:
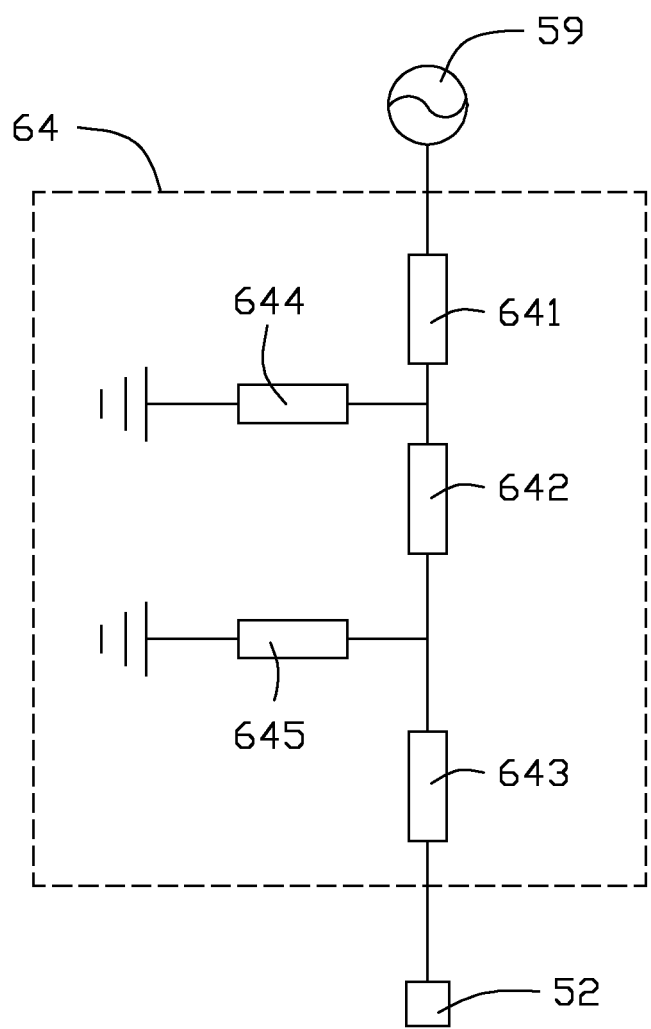
FIG. 23 is a circuit diagram of a matching circuit of the antenna structure of FIG. 19.
Figure 24:
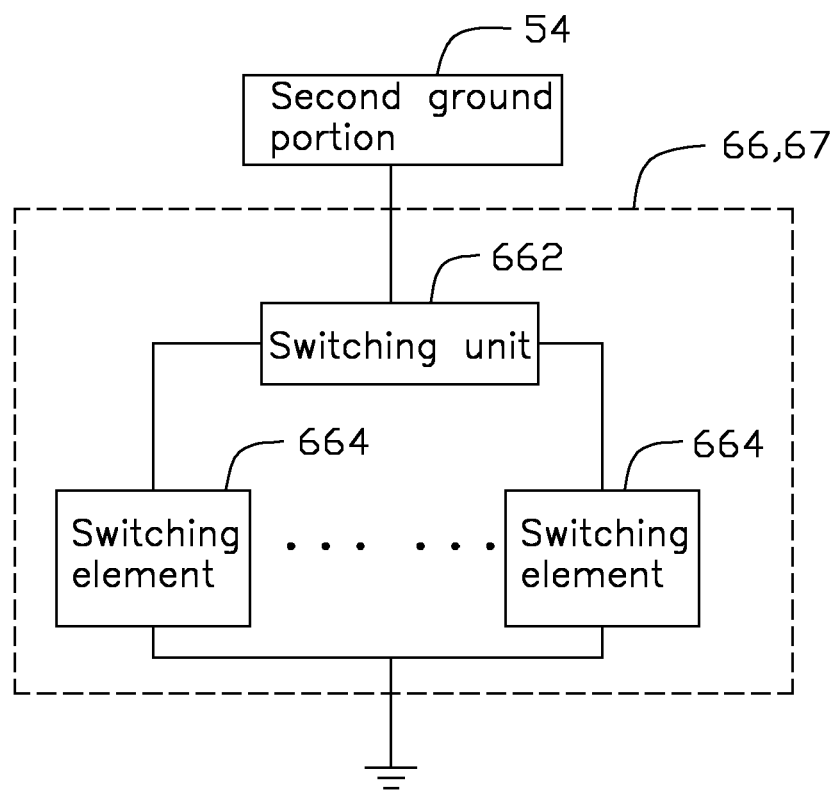
FIG. 24 is a circuit diagram of a switching circuit of the antenna structure of FIG. 19.

Per FIG. 19, FIG. 20 and FIG. 21, the antenna structure 500 includes a metallic member 51, a first feed portion 52, a first ground portion 53, a second ground portion 54, an extending section 55, a radiating portion 56, a second feed portion 57, a third ground portion 58, a matching circuit 64 (shown in FIG. 23), a first switching circuit 66, and a second switching circuit 67 (shown in FIG. 24).

The metallic member 51 can be a metal housing of the wireless communication device 600. In this exemplary embodiment, the metallic member 51 is a frame structure and includes a front frame 511, a backboard 512, and a side frame 513. The front frame 511, the backboard 512, and the side frame 513 can be integral with each other. The front frame 511, the backboard 512, and the side frame 513 cooperatively form the metal housing of the wireless communication device 600. The front frame 511 defines an opening (not shown) thereon. The wireless communication device 600 includes a display 601. The display 601 is received in the opening. The display 601 has a display surface. The display surface is exposed at the opening and is positioned parallel to the backboard 512.

The backboard 512 is positioned opposite to the front frame 511. The backboard 512 is coupled to the side frame 513, and there is no gap between the backboard 512 and the side frame 513. The backboard 512 is an integrally formed metallic sheet. Except the holes for exposing dual backside cameras and a receiver, the backboard 512 does not define any other slot, break line, and/or gap. The backboard 512 serves as a ground of the antenna structure 500.

The side frame 513 is positioned between the front frame 511 and the backboard 512. The side frame 513 is positioned around a periphery of the front frame 511 and a periphery of the backboard 512. The side frame 513 forms a receiving space 514 together with the display 601, the front frame 511, and the backboard 512. The receiving space 514 can receive a print circuit board 610, a processing unit, or other electronic components or modules. In this exemplary embodiment, the electronic components or modules at least include an audio jack 602 and a USB connector 603. The audio jack 602 and the USB connector 603 are arranged on the print circuit board 610 and spaced apart from each other.

The side frame 513 includes a bottom portion 515, a first side portion 516, and a second side portion 517. The bottom portion 515 connects the front frame 511 and the backboard 512. The first side portion 516 is spaced apart from and parallel to the second side portion 517. The bottom portion 515 has first and second ends. The first side portion 516 is connected to the first end of the first frame 311 and the second side portion 517 is connected to the second end of the bottom portion 515. The first side portion 516 connects the front frame 511 and the backboard 512. The second side portion 517 also connects the front frame 511 and the backboard 512. The side frame 513 defines a slot 518. In this exemplary embodiment, the slot 518 is defined at the bottom portion 515 and extends to the first side portion 516 and the second side portion 517. In other exemplary embodiments, the slot 518 can only be defined at the bottom portion 515 and does not extend to any one of the first side portion 516 and the second side portion 517. In other exemplary embodiments, the slot 518 can be defined only at the bottom portion 515, but not extending to any of the first side portion 516 and the second side portion 517. In other exemplary embodiments, the slot 518 can be defined at the bottom portion 515 and extends to one of the first side portion 516 and the second side portion 517.

The front frame 511 defines a first gap 5112 and a second gap 5114 at two side arms, respectively. The first gap 5112 and the second gap 5114 are defined on opposite ends of the slot 518. The gaps 5112, 5114 are in air communication with the slot 518 and extend across the front frame 511. The front frame 511 between the first gap 5112 and the second gap 5114 forms a radiating section 62. In this exemplary embodiment, the radiating section 62 extends from the top arm to two side arms of the front frame 511 and crosses two arc corners. In this exemplary embodiment, the slot 518 and the gaps 5112, 5114 are filled with insulating material, for example, plastic, rubber, glass, wood, ceramic, or the like, thereby isolating the radiating section 62 and the backboard 512.

The slot 518 defines two holes 5182, 5183 corresponding to the audio jack 602 and the USB connector 603, respectively. Thus, the audio jack 602 and the USB connector 603 may partially expose from the wireless communication device 400 for connecting an earphone and a USB device, respectively.

In this exemplary embodiment, except for the slot 518 and the gaps 5112, 5114, an lower half portion of the front frame 511 and the side frame 513 does not define any other slot, break line, and/or gap. That is, there are only the gaps 5112, 5114 defined on the lower half portion of the front frame 511.

One end of the first feed portion 52 connects to the radiating section 62, the other end electronically connects to a feed source 59 through the matching circuit 64 (shown in FIG. 23). Thus, the feed source 59 feeds current into the radiating section 62 through the matching circuit 64 and the first feed portion 52. In this exemplary embodiment, after the current is fed into the first feed portion 52, the current flows towards the first gap 5112 and the second gap 5114 along the radiating section 62. Thus, the radiating section 62 is divided into a short portion C1 and a long portion C2. The short portion C1 extends towards the first gap 5112 and the long portion C2 extends towards the second gap 5114 from the connecting point of the first feed portion 52. In this exemplary embodiment, the connecting point of the first feed portion 52 is not positioned at a middle portion of the radiating section 62. The long portion C2 is longer than the short portion C1.

The radiating section 62 connects to the first ground portion 53 and the second ground portion 54. The first ground portion 53 and the second ground portion 54 are positioned on opposite sides of the first feed portion 52. The first ground portion 53 connects to the short portion C1 and the second ground portion 54 connects to the long portion C2. The first ground portion 53 and the second ground portion 54 are both substantially L-shaped. The first ground portion 53 is spaced adjacent to the audio jack 602. The first ground portion 53 includes a first arm 532, a second arm 534, and a third arm 536. The second arm 532 is substantially U-shaped and connects to the first arm 532 and the third arm 536 on opposite ends. The second arm 534 surrounds the hole 5182. The second arm 534 and the third arm 536 are spaced apart from the radiating section 62. The first arm 532 connects to the second arm 534 and the short portion C1. The third arm 536 connects to the backboard 512, that is connects to the ground.

The extending section 55 is received in the receiving space 514. The extending section 55 extends from an end of the long portion C2 and is adjacent to the second gap 5114 along a direction towards the first gap 5112, and extends passing a position of the second ground portion 54. The extending section 55 is parallel to and spaced apart from the bottom arm of the front frame 511.

The short portion C1 and the first ground portion 53 activate a first mode to generate radiation signals in a first frequency band, the long portion C2 activates a second mode to generate radiation signals in a second frequency band, the long portion C2 and the extending section 55 cooperatively activate third mode to generate radiation signals in a third frequency band. In this exemplary embodiment, the first mode is a LTE-A (Long Term Evolution Advanced) middle frequency operation mode, the first frequency band is a frequency band of about 1710-1990 MHz. The second mode is a LTE-A low frequency operation mode, the second frequency band is a frequency band of about 703-960 MHz. The third mode is another LTE-A middle frequency operation mode, the third frequency band is a frequency band of about 2110-2170 MHz.

Per FIG. 23, the matching circuit 64 is electrically connected between the first feed portion 52 and the feed source 59. The matching circuit 64 and the feed source 59 are both arranged on the printed circuit board 610. The matching circuit 64 includes a first impedance element 641, a second impedance element 642, a third impedance element 643, a fourth impedance element 644, and a fifth impedance element 645. The first impedance element 641, the second impedance element 642, and the third impedance element 643 are electrically connected in series. The first impedance element 641 is electrically connected to the feed source 59, the third impedance element 643 is electrically connected to the first feed portion 52. One end of the fourth impedance element 644 is electrically connected between the first impedance element 641 and the second impedance element 642, the other end connects to the ground. One end of the fifth impedance element 645 is electrically connected between the second impedance element 642 and the third impedance element 643, the other end connects to the ground. The matching circuit 64 may increase a bandwidth of the LTE-A middle frequency band for the radiating section 62. In this exemplary embodiment, the first impedance element 641 can be an inductor with 9.8 nanohenry (nH), the second impedance element 642 can be an inductor with 1.8 nH, the third impedance element 643 can be a capacitor with 0.8 picofarad (pF), the fourth impedance element 644 can be a capacitor with 0.87 pF, and the fifth impedance element 645 can be a capacitor with 0.3 pF.

Per FIG. 24, one end of the first switching circuit 66 connects to the second ground portion 54, the other end connects to the ground. The backboard 512 serves as the ground of the antenna structure 500. Perhaps, a middle frame or a shielding mask (not shown) also may serves as the ground of the antenna structure 500, the middle frame can be a shielding mask for shielding electromagnetic interference arranged on the display 601 facing the backboard 512. The shielding mask or the middle frame can be made of metal material. The shielding mask or the middle frame may connect to the backboard 512 to form a greater ground for the antenna structure 500. In summary, each ground portion directly or indirectly connects to the ground.

The first switching circuit 66 includes a switching unit 662 and a plurality of switching elements 664. The switching unit 662 is electrically connected to the second ground portion 54. The switching elements 664 can be an inductor, a capacitor, or a combination of the inductor and the capacitor. The switching elements 664 are connected in parallel to each other. One end of each switching element 664 is electrically connected to the switching unit 662. The other end of each switching element 664 is electrically connected to the backboard 512. Through controlling the switching unit 662, the long portion C2 can be switched to connect with different switching elements 664. Since each switching element 664 has a different impedance, an operating frequency band of the long portion C2 can be adjusted through switching the switching unit 662, for example, the frequency band of the second mode of the long portion C2 can be offset towards a lower frequency or towards a higher frequency (relative to each other). The LTE-A low frequency mode may cover frequencies bands of about 703-804 MHz, 824-894 MHz, and 880-960 MHz by adjusting the impedance of the first switching circuit 66. The second switching circuit 67 is substantially similar to the first switching circuit 66. One end of the second switching circuit 67 electrically connects to the third ground portion 58, the other end connects to the ground. The first frequency band may be adjusted by adjusting a connecting position of the first ground portion 53 and the short portion C1, and by adjusting a bent length of the first ground portion 53. The third frequency band may be adjusted by adjusting a length of the extending section 55. When the length of the extending section 55 increases, the third frequency band decreases; when the length of the extending section 55 decreases, the third frequency band increases.

The radiating portion 56 includes a fourth arm 562, a fifth arm 564, and a sixth arm 566. The fourth arm 562 is substantially perpendicularly connected to the backboard 512. The fifth arm 564 is substantially perpendicularly connected to an end of the fourth arm 562 away from the backboard 512 and extends in a same direction with the extending direction of the extending section 55. The fifth arm 564 is parallel to the extending section 55 and extends to above the USB connector 603. The sixth arm 566 is substantially an L-shaped arm and connects to an end of the fifth arm 564 away from the fourth arm 562. The sixth arm 566 extends outwardly from the fifth arm 564 and bents towards the fourth arm 562 and is parallel to the fifth arm 564. The second feed portion 57 and the third ground portion 58 are both substantially straight arms. The second feed portion 57 is parallel to and spaced apart from the fourth arm 562, and connects to the fifth arm 564. The third ground portion 58 is parallel to and spaced apart from the second feed portion 57, and connects to the fifth arm 564. The second feed portion 57 feeds current into the radiating portion 56 to cooperatively activate a fourth mode to generate radiation signals in a fourth frequency band. In this exemplary embodiment, the fourth mode is a LTE-A high frequency mode, the fourth frequency band is a frequency band of about 2300-2690 MHz.

In this exemplary embodiment, to obtain preferred antenna characteristics, a width of the slot 518 can be 3.9 millimeter, that is a distance between the backboard 512 and the radiating section 62 can be 3.9 millimeter, the width of the slot 518 can be adjusted in a range of about 3-4.5 millimeter, thus to improve antenna characteristic for the radiating sections by being spaced apart from the backboard 512. A width of each of the gaps 5112, 5114 can be 2 millimeter and can be adjusted in a range of about 1.5-2.5 millimeter, which may further improve antenna characteristic for the radiating sections. A thickness of the front frame 511 can be 1.5 millimeter, that is a thickness of the gaps 5112, 5114 can be 1.5 millimeter.

Per FIG. 13, when the current enters the radiating section 62 from the first feed portion 52, the current flows towards two direction, one direction flows through the short portion C1 and towards the first gap 5112 and the first ground portion 53 (please see a path P1), thus, activating the first mode. When the current enters the radiating section 62 from the first feed portion 52, another direction flows through the long portion C2 and towards the second gap 5114 (please see a path P2), thus, activating the second mode. Meanwhile, when the current enters the radiating section 62 from the first feed portion 52, flows through the long portion C2 and towards the second gap 5114, and further flows through the extending section 55 (please see a path P3), thus, activating the third mode. When current enters the radiating portion 56 from the second feed portion 57, flows through the radiating portion 56 along its extending direction and flows through the third ground portion 58 (please see a path P4), thus, activating the fourth mode.

Figure 25:
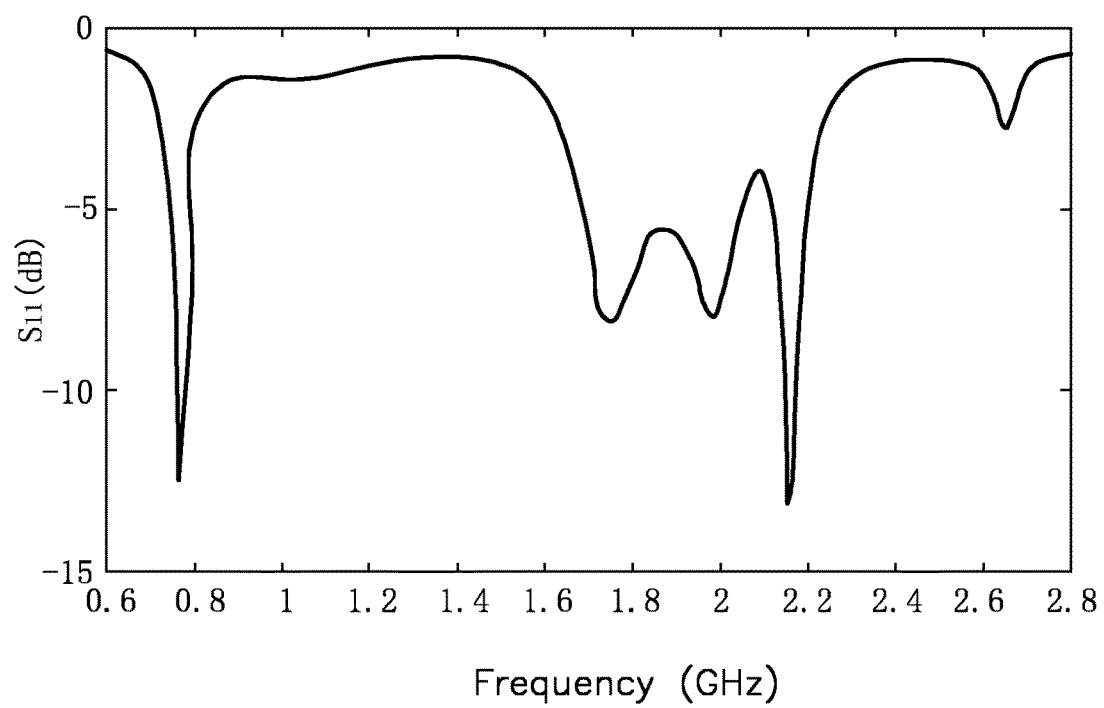
FIG. 25 is a scattering parameter graph when the antenna structure of FIG. 19 is working.

FIG. 25 illustrates a scattering parameter graph of the antenna structure 500 when operates at different frequencies bands.

Figure 26:
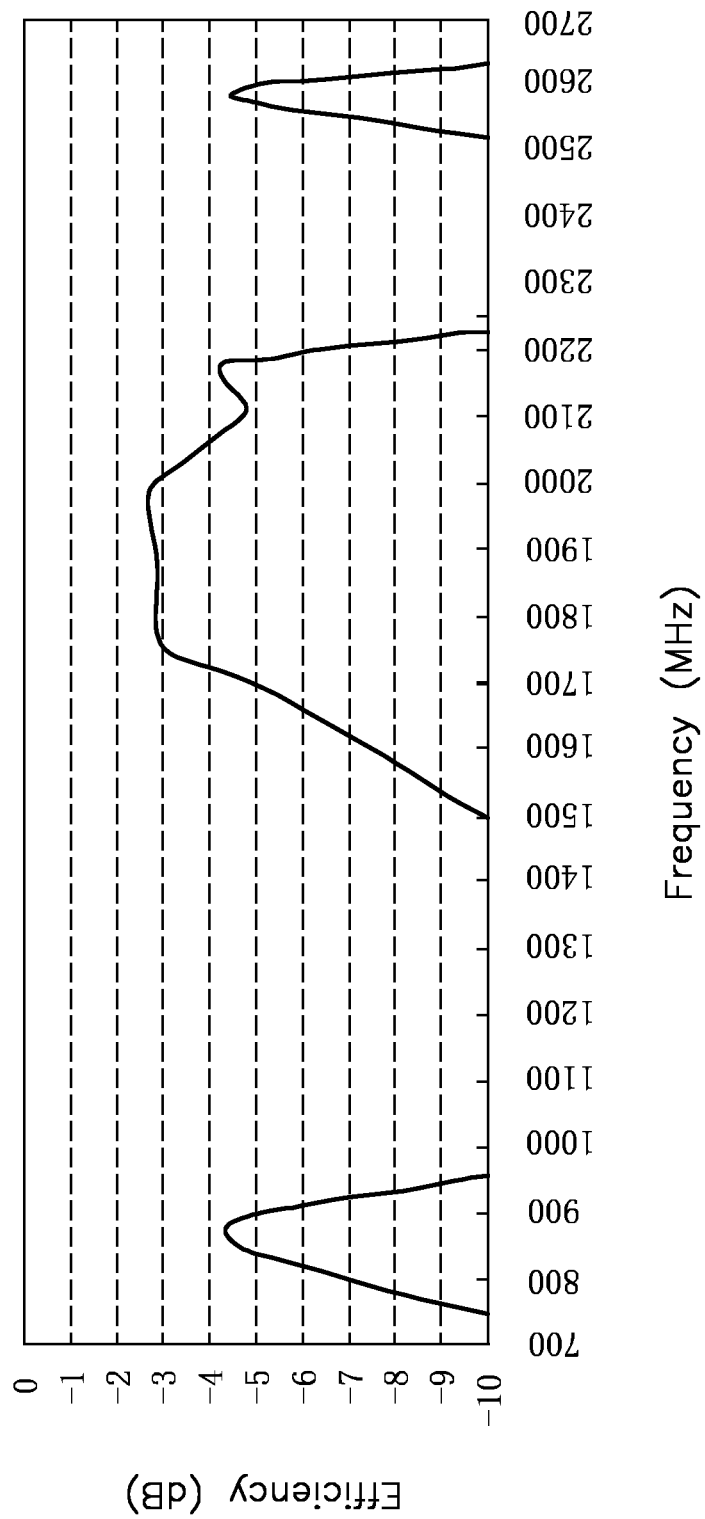
FIG. 26 is a radiating efficiency graph when the antenna structure of FIG. 19 is working.

FIG. 26 illustrates a radiating efficiency graph of the antenna structure 500 when operates at different frequency bands.

The antenna structure 500 can work at a low frequency band, for example, LTE-A low frequency band (703-960 MHz), at a middle frequency band (1710-1990 MHz), at another middle frequency band (2110-2170 MHz), and at a high frequency band (2300-2690 MHz), and when the antenna structure 500 operates at these frequency bands, a working frequency satisfies a design of the antenna and also has a good radiating efficiency.

The antenna structure 500 includes the metallic member 51 and the backboard 512. The metallic member 51 defines the slot on the side frame 513 and the gaps on the front frame 511. The backboard 512 is an integrally formed metallic sheet without other slot, break line, and/or gap, which maintains integrity and aesthetics.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An antenna structure comprising:
   a metallic member, the metallic member comprising a front frame, a backboard, and a side frame, the side frame being between the front frame and the backboard, the side frame comprising at least a bottom portion, a first side portion, and a second side portion, the first side portion and the second side portion respectively connected to two ends of the bottom portion;
   a first feed portion;
   a first ground portion;
   a second ground portion; and
   an extending section received in a space surrounded by the front frame, the side frame, and the backboard;
   wherein the side frame defines a slot, the slot is defined on at least the bottom portion;
   wherein the front frame defines a first gap and a second gap, the first gap and the second gap are on two opposite ends of the slot, the first gap and the second gap communicate with the slot and extend across the front frame;
   wherein a portion of the front frame between the first gap and the second gap forms a radiating section, the extending section connects to an end of the radiating section adjacent to the second gap, the first feed portion, the first ground portion, and the second ground portion are electrically connected to the radiating section, the first feed portion is positioned between the first ground portion and the second ground portion; and wherein current enters the radiating section from the first feed portion, the current flows through the radiating section and towards the first gap and the second gap, respectively, to generate radiation signals in a first frequency band and a second frequency band, the current further flows through the radiating section and towards the second gap and through the extending section to generate radiation signals in a third frequency band, a frequency of the first frequency band is higher than a frequency of the second frequency band, a frequency of the third frequency band is higher than the frequency of the first frequency band.

2. The antenna structure of claim 1, wherein the slot and the gaps are all filled with insulating material.

3. The antenna structure of claim 1, wherein the slot extends from the bottom portion to the first side portion and the second side portion of the side frame.

4. The antenna structure of claim 3, wherein the radiating section is divided into a short portion and a long portion by a connecting point of the first feed portion, the short portion extends towards the first gap and the long portion extends towards the second gap from the connecting point of the first feed portion; the long portion is longer than the short portion.

5. The antenna structure of claim 4, wherein the first ground portion connects to the short portion and the second ground portion connects to the long portion, the other end of the second ground portion connects to a ground through a first switching circuit.

6. The antenna structure of claim 5, wherein the first ground portion includes a first arm, a second arm, and a third arm, the second arm is substantially U-shaped and connects to the first arm and the third arm on opposite ends, the second arm surrounds a hole defined on the slot, the second arm and the third arm are spaced apart from the radiating section, the first arm connects to the second arm and the short portion, the third arm connects to the ground.

7. The antenna structure of claim 5, wherein the extending section extends from an end of the long portion adjacent to the second gap along a direction towards the first gap, and extends passing a position of the second ground portion, the extending section is parallel to and spaced apart from a bottom arm of the front frame.

8. The antenna structure of claim 5, further comprising a matching circuit, wherein the matching circuit is electrically connected between the first feed portion and a feed source; the matching circuit includes a first impedance element, a second impedance element, a third impedance element, a fourth impedance element, and a fifth impedance element, the first impedance element, the second impedance element, and the third impedance element are electrically connected in series, the first impedance element is electrically connected to the feed source, the third impedance element is electrically connected to the first feed portion; one end of the fourth impedance element is electrically connected between the first impedance element and the second impedance element, the other end connects to the ground; one end of the fifth impedance element is electrically connected between the second impedance element and the third impedance element, the other end connects to the ground.

9. The antenna structure of claim 5, wherein the first switching circuit includes a switching unit and a plurality of switching elements; the switching unit is electrically connected to the second ground portion; the switching elements are connected in parallel to each other; one end of each switching element is electrically connected to the switching unit, the other end of each switching element is electrically connected to the ground; through controlling the switching unit, the long portion is switched to connect with different switching elements; since each switching element has a different impedance, the second frequency band of the long portion is adjusted through switching the switching unit of the first switching circuit.

10. The antenna structure of claim 5, wherein the short portion activates a first mode to generate radiation signals in the first frequency band, the long portion activates a second mode to generate radiation signals in the second frequency band, the long portion and the extending section cooperatively activate a third mode to generate radiation signals in the third frequency band; the first mode is an LTE-A (Long Term Evolution Advanced) middle frequency operation mode, the first frequency band is a frequency band of about 1710-1990 MHz; the second mode is an LTE-A low frequency operation mode, the second frequency band is a frequency band of about 703-960 MHz; the third mode is another LTE-A middle frequency operation mode, the third frequency band is a frequency band of about 2110-2170 MHz.

11. The antenna structure of claim 10, wherein the first frequency band is adjusted by adjusting a connecting position of the first ground portion and the short portion, and by adjusting a bent length of the first ground portion; the third frequency band is adjusted by adjusting a length of the extending section; when the length of the extending section increases, frequencies of the third frequency band decrease; when the length of the extending section decreases, frequencies of the third frequency band increase.

12. The antenna structure of claim 10, further comprising a radiating portion, wherein the radiating portion includes a fourth arm, a fifth arm, and a sixth arm; the fourth arm is substantially perpendicularly connected to the backboard; the fifth arm is substantially perpendicularly connected to an end of the fourth arm away from the backboard and extends in a same direction with an extending direction of the extending section; the fifth arm is parallel to and spaced apart from the extending section; the sixth arm is substantially an L-shaped arm and connects to an end of the fifth arm away from the fourth arm; the sixth arm extends outwardly from the fifth arm and then bents towards the fourth arm and a portion of the sixth arm is parallel to the fifth arm.

13. The antenna structure of claim 12, further comprising a second feed portion and a third ground portion, wherein the second feed portion and the third ground portion are both substantially straight arms; the second feed portion is parallel to and spaced apart from the fourth arm, and connects to the fifth arm; the third ground portion is parallel to and spaced apart from the second feed portion, and connects to the fifth arm.

14. The antenna structure of claim 13, wherein the second feed portion feeds current into the radiating portion to activate a fourth mode to generate radiation signals in a fourth frequency band, the fourth mode is an LTE-A high frequency mode, the fourth frequency band is a frequency band of about 2300-2690 MHz.

15. The antenna structure of claim 14, further comprising a second switching circuit, wherein one end of the second switching circuit electrically connects to the third ground portion, the other end connects to the ground; the fourth frequency band is adjusted through switching a switching unit of the second switching circuit.

16. The antenna structure of claim 15, wherein a width of the slot is in a range from 3 to 4.5 millimeter, that is, a distance between the backboard and the radiating section is in a range of from 3 to 4.5 millimeter; a width of each of the gaps is in a range from 1.5 to 2.5 millimeter.

17. The antenna structure of claim 1, wherein the backboard is directly connected to the side frame and there is no any gap between the backboard and the side frame, the backboard is an integral and single metallic sheet, the backboard does not define any slot, break line, or gap for dividing the backboard.

18. A wireless communication device, comprising:
an antenna structure comprising:
 a metallic member, the metallic member comprising a front frame, a backboard, and a side frame, the side frame being between the front frame and the backboard, the side frame comprising at least a bottom portion, a first side portion, and a second side portion, the first side portion and the second side portion respectively connected to two ends of the bottom portion;
 a first feed portion;
 a first ground portion;
 a second ground portion; and
 an extending section received in a space surrounded by the front frame, the side frame, and the backboard;
wherein the side frame defines a slot, the slot is defined on at least the bottom portion;
wherein the front frame defines a first gap and a second gap, the first gap and the second gap are on two opposite ends of the slot, the first gap and the second gap communicate with the slot and extends across the front frame;
wherein a portion of the front frame between the first gap and the second gap forms a radiating section, the extending section connects to an end of the radiating section adjacent to the second gap, the first feed portion, the first ground portion, and the second ground portion are electrically connected to the radiating section, the first feed portion is positioned between the first ground portion and the second ground portion; and
wherein current enters the radiating section from the first feed portion, the current flows through the radiating section and towards the first gap and the second gap, respectively, to generate radiation signals in a first frequency band and a second frequency band, the current further flows through the radiating section and towards the second gap, and through the extending section to generate radiation signals in a third frequency band, a frequency of the first frequency band is higher than a frequency of the second frequency band, a frequency of the third frequency band is higher than the frequency of the first frequency band.

19. The wireless communication device of claim 18, further comprising a display, wherein the front frame, the backboard, and the side frame cooperatively form a metal housing of the wireless communication device, the front frame defines an opening, the display is received in the opening, a display surface of the display is exposed at the opening and is positioned parallel to the backboard.

20. The wireless communication device of claim 18, further comprising an audio jack and a Universal Serial Bus (USB) connector, wherein the audio jack and the USB connector are spaced apart from each other, the slot defines two holes corresponding to the audio jack and the USB connector, respectively; the first feed portion and the first ground portion are on opposite sides of the audio jack, the first ground portion is adjacent to the audio jack; the first feed portion and the second ground portion are on opposite sides of the USB connector.

* * * * *